(12) United States Patent
Okamura et al.

(10) Patent No.: US 12,557,101 B2
(45) Date of Patent: Feb. 17, 2026

(54) TERMINAL, BASE STATION APPARATUS AND FEEDBACK METHOD

(71) Applicant: NTT DOCOMO, INC., Tokyo (JP)

(72) Inventors: Masaya Okamura, Tokyo (JP); Hiroki Harada, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 435 days.

(21) Appl. No.: 18/006,679

(22) PCT Filed: Aug. 5, 2020

(86) PCT No.: PCT/JP2020/030099
§ 371 (c)(1),
(2) Date: Jan. 24, 2023

(87) PCT Pub. No.: WO2022/029947
PCT Pub. Date: Feb. 10, 2022

(65) Prior Publication Data
US 2023/0319823 A1    Oct. 5, 2023

(51) Int. Cl.
*H04W 72/23*    (2023.01)
*H04W 72/1273*    (2023.01)

(52) U.S. Cl.
CPC ....... *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2015/0215078 A1* | 7/2015 | Chen | H04W 56/0015 370/336 |
| 2019/0349918 A1* | 11/2019 | Nayeb Nazar | H04L 1/007 |
| 2020/0288457 A1* | 9/2020 | Hong | H04L 1/1812 |
| 2023/0198683 A1* | 6/2023 | Gao | H04W 72/1273 370/280 |

OTHER PUBLICATIONS

Huawei, HiSilicon, "NR CA enhancements and DSS", 3GPP TSG RAN Meeting #86, RP-192797, Sitges, Spain, Dec. 9-12, 2019 (3 pages).
3GPP TS 38.300 V15.9.0, "3rd Generation Partnership Project; Technical Specification Group Radio Access Network; NR; NR and NG-RAN Overall Description; Stage 2 (Release 15)" Mar. 2020 (100 pages).
3GPP TS 38.331 V15.9.0, "3rd Generation Partnership Project; Technical Specification Group Radio Access Network; NR; Radio Resource Control (RRC) protocol specification (Release 15)" Mar. 2020 (536 pages).

(Continued)

*Primary Examiner* — Abdelillah Elmejjarmi
(74) *Attorney, Agent, or Firm* — Osha Bergman Watanabe & Burton LLP

(57) ABSTRACT

A terminal including: a reception unit configured to receive a piece of control information for scheduling PDSCH reception in multiple CCs from a base station apparatus; and a control unit configured to obtain a feedback timing indicator value from the control information, and to determine a feedback timing for each CC of the multiple CCs by using the feedback timing indicator value.

6 Claims, 17 Drawing Sheets

(56) References Cited

OTHER PUBLICATIONS

3GPP TS 38.213 V15.9.0, "3rd Generation Partnership Project; Technical Specification Group Radio Access Network; NR; Physical layer procedures for control (Release 15)" Mar. 2020 (109 pages).
3GPP TS 38.213 V16.2.0, "3rd Generation Partnership Project; Technical Specification Group Radio Access Network; NR; Physical layer procedures for control (Release 16)" Jun. 2020 (176 pages).
International Search Report issued in Application No. PCT/JP2020/030099 mailed on Dec. 22, 2020 (3 pages).
Written Opinion issued in Application No. PCT/JP2020/030099 mailed on Dec. 22, 2020 (4 pages).

* cited by examiner

FIG.8

| PDSCH-to-HARQ_feedback timing indicator A/ PDSCH-to-HARQ_feedback timing indicator B | | | Number of slots $k$ |
|---|---|---|---|
| 1 bit | 2 bits | 3 bits | |
| '0' | '00' | '000' | 1st value provided by dl-DataToUL-ACK |
| '1' | '01' | '001' | 2nd value provided by dl-DataToUL-ACK |
| | '10' | '010' | 3rd value provided by dl-DataToUL-ACK |
| | '11' | '011' | 4th value provided by dl-DataToUL-ACK |
| | | '100' | 5th value provided by dl-DataToUL-ACK |
| | | '101' | 6th value provided by dl-DataToUL-ACK |
| | | '110' | 7th value provided by dl-DataToUL-ACK |
| | | '111' | 8th value provided by dl-DataToUL-ACK |

FIG.9

| PDSCH-to-HARQ_feedback timing indicator | | | Number of slots k | |
|---|---|---|---|---|
| 1 bit | 2 bits | 3 bits | For PDSCH on the scheduled CC#x | For PDSCH on the scheduled CC#y |
| '0' | '00' | '000' | 1st value provided by dl-DataToUL-ACK | 1st value provided by dl-DataToUL-ACK |
| '1' | '01' | '001' | 2nd value provided by dl-DataToUL-ACK | 1st value provided by dl-DataToUL-ACK |
| | '10' | '010' | 1st value provided by dl-DataToUL-ACK | 2nd value provided by dl-DataToUL-ACK |
| | '11' | '011' | 2nd value provided by dl-DataToUL-ACK | 2nd value provided by dl-DataToUL-ACK |
| | | '100' | 1st value provided by dl-DataToUL-ACK | 3rd value provided by dl-DataToUL-ACK |
| | | '101' | 2nd value provided by dl-DataToUL-ACK | 3rd value provided by dl-DataToUL-ACK |
| | | '110' | 1st value provided by dl-DataToUL-ACK | 4th value provided by dl-DataToUL-ACK |
| | | '111' | 2nd value provided by dl-DataToUL-ACK | 4th value provided by dl-DataToUL-ACK |

FIG.10

| PDSCH-to-HARQ_feedback timing indicator | | | | Number of slots $k$ | |
|---|---|---|---|---|---|
| 1 bit | 2 bits | 3 bits | 4 bits | For PDSCH on the scheduled CC#x | For PDSCH on the scheduled CC#y |
| '0' | '00' | '000' | '0000' | 1st value provided by *dl-DataToUL-ACK* | 1st value provided by *dl-DataToUL-ACK* |
| '1' | '01' | '001' | '0001' | 2nd value provided by *dl-DataToUL-ACK* | 1st value provided by *dl-DataToUL-ACK* |
| | '10' | '010' | '0010' | 3st value provided by *dl-DataToUL-ACK* | 1st value provided by *dl-DataToUL-ACK* |
| | '11' | '011' | '0011' | 4nd value provided by *dl-DataToUL-ACK* | 1st value provided by *dl-DataToUL-ACK* |
| | | '100' | '0100' | 1st value provided by *dl-DataToUL-ACK* | 2st value provided by *dl-DataToUL-ACK* |
| | | '101' | '0101' | 2nd value provided by *dl-DataToUL-ACK* | 2st value provided by *dl-DataToUL-ACK* |
| | | '110' | '0110' | 3st value provided by *dl-DataToUL-ACK* | 2st value provided by *dl-DataToUL-ACK* |
| | | '111' | '0111' | 4nd value provided by *dl-DataToUL-ACK* | 2st value provided by *dl-DataToUL-ACK* |
| | | | '1000' | 1st value provided by *dl-DataToUL-ACK* | 3st value provided by *dl-DataToUL-ACK* |
| | | | '1001' | 2nd value provided by *dl-DataToUL-ACK* | 3st value provided by *dl-DataToUL-ACK* |
| | | | '1010' | 3st value provided by *dl-DataToUL-ACK* | 3st value provided by *dl-DataToUL-ACK* |
| | | | '1011' | 4nd value provided by *dl-DataToUL-ACK* | 3st value provided by *dl-DataToUL-ACK* |
| | | | '1100' | 1st value provided by *dl-DataToUL-ACK* | 4st value provided by *dl-DataToUL-ACK* |
| | | | '1101' | 2nd value provided by *dl-DataToUL-ACK* | 4st value provided by *dl-DataToUL-ACK* |
| | | | '1110' | 3st value provided by *dl-DataToUL-ACK* | 4st value provided by *dl-DataToUL-ACK* |
| | | | '1111' | 4nd value provided by *dl-DataToUL-ACK* | 4st value provided by *dl-DataToUL-ACK* |

TERMINAL, BASE STATION APPARATUS AND FEEDBACK METHOD

TECHNICAL FIELD

The present invention relates to a terminal and a base station apparatus in a wireless communication system.

BACKGROUND ART

In 3GPP (3rd Generation Partnership Project), a wireless communication system (hereinafter referred to as "NR") called 5G or NR (New Radio) is being studied in order to realize further increase of system capacity, further increase of data transmission speed, and further decrease of delay in the wireless section. In 5G, various wireless technologies and network architectures are being studied (e.g., Non-Patent Document 1) in order to achieve a throughput of 10 Gbps or higher and to satisfy the requirement that delay in the wireless section should be 1 ms or less.

Dynamic spectrum sharing (DSS) is being studied to ensure that LTE and NR coexist in the same band. Coexistence of different RATs (Radio Access Technology) in a single carrier allows flexible support of traffic demand at a period of system generation switching.

PRIOR ART DOCUMENTS

Non-Patent Document

[Non-Patent Document 1] 3GPP TS 38. 300 V15. 9. 0 (2020-03)
[Non-Patent Document 2] 3GPP TS 38. 331 V15. 9. 0 (2020-03)
[Non-Patent Document 3] 3GPP TS 38. 213 V15. 9. 0 (2020-03)

SUMMARY OF INVENTION

Problem to be Solved by the Invention

In the current DSS specification, each of an LTE terminal and an NR terminal is configured with a resource for transmitting and receiving a control signal. The resource where the control signal can be placed is predefined and the systems are coexisted in a single carrier, it is assumed that there will be insufficient resources for transmitting and receiving the control signals rather than each system being operated independently in different carriers.

Therefore, in DSS, in order to use resources efficiently, it is being considered to schedule PDSCH reception in multiple CCs (multiple cells) in a single DCI.

However, when scheduling PDSCH reception at multiple CCs with a single DCI, the timing of transmitting HARQ information (ACK/NACK) for PDSCH reception at a terminal may differ between CCs. If the timing for transmitting HARQ information differs between CCs, use of PUCCH resources becomes inefficient. Note that, such problems arise when PDSCH reception is scheduled in multiple CCs with a single DCI, not only when DSS is used.

The present invention has been made in view of the foregoing, and is intended to provide a technique for enabling a terminal to transmit HARQ information for PDSCH reception at the same timing between CCs when PDSCH reception is scheduled in multiple CCs with one DCI.

Means for Solving Problems

According to the disclosed technique, there is provided a terminal including:
a reception unit configured to receive a piece of control information for scheduling PDSCH reception in a plurality of CCs from a base station apparatus; and
a control unit configured to obtain a feedback timing indicator value from the control information, and to determine a feedback timing for each CC of the plurality of CCs by using the feedback timing indicator value.

Effects of the Invention

According to the disclosed technique, there is provided a technique for enabling a terminal to transmit HARQ information for PDSCH reception at the same timing between CCs when PDSCH reception is scheduled in multiple CCs with one DCI.

BRIEF DESCRIPTION OF DRAWINGS

FIG. 8 A diagram showing an example of a table.
FIG. 9 A diagram showing an example of a table.
FIG. 10 A diagram showing an example of a table.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques may be used as appropriate. The existing technology is, for example, an existing NR or LTE, but is not limited to an existing NR or LTE.

(System Configuration)

Figure 1:
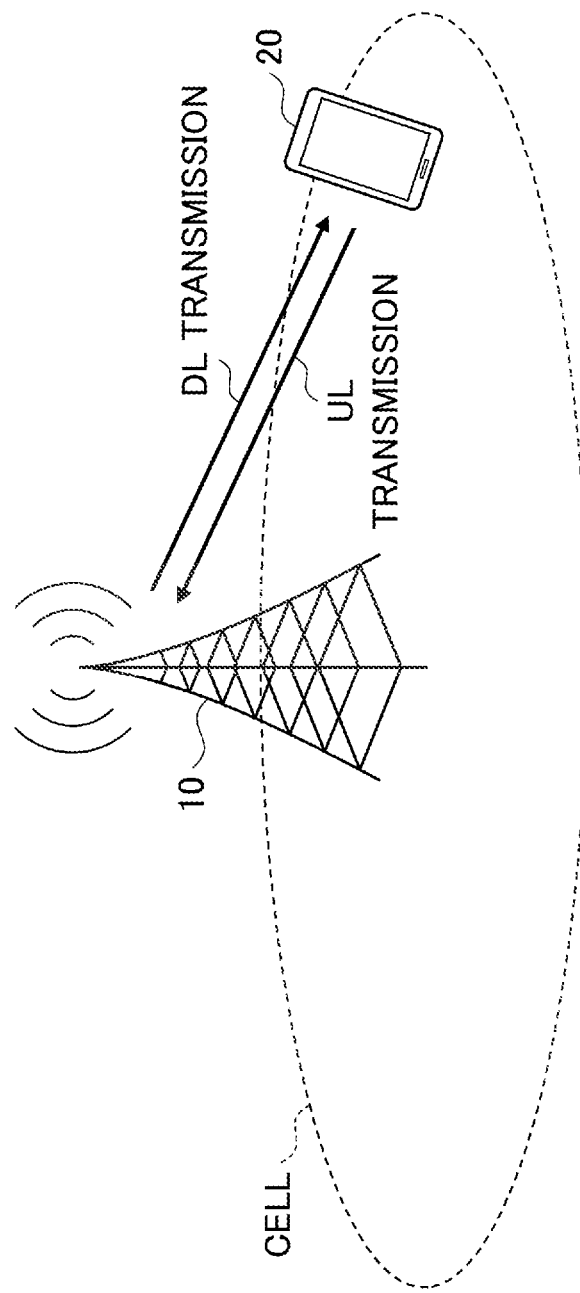
FIG. 1 A diagram for explaining a wireless communication system according to an embodiment of the present invention.

FIG. 1 is a diagram illustrating a wireless communication system according to an embodiment of the present invention. The wireless communication system in an embodiment of the present invention includes a base station apparatus 10 and a terminal 20, as shown in FIG. 1. In FIG. 1, one base station apparatus 10 and one terminal 20 are shown, but this is an example and a plurality of base station apparatuses 10 and a plurality of terminal 20 may be provided.

The base station apparatus 10 is a communication device that provides one or more cells and performs wireless communication with the terminal 20. The physical resources of the radio signal are defined in the time domain and the frequency domain, the time domain may be defined in OFDM symbols, and the frequency domain may be defined in subcarriers or resource blocks. TTI (Transmission Time Interval) in the time domain may be a slot, or TTI may be a subframe.

The base station apparatus 10 can provide carrier aggregation for communicating with the terminal 20 by aggregating a plurality of cells (a plurality of CCs (component carriers)). Carrier aggregation uses one PCell (primary cell) and one or more SCells (secondary cells).

The base station apparatus 10 transmits synchronization signals and system information to the terminal 20. The synchronization signals are, for example, NR-PSS and NR-SSS. System information is transmitted, for example, by NR-PBCH or PDSCH, and is also called broadcast information. As shown in FIG. 1, the base station apparatus 10 transmits a control signal or data in DL (Downlink) to the terminal 20 and receives a control signal or data in UL (Uplink) from the terminal 20. Here, what is transmitted by a control channel such as PUCCH and PDCCH is called a control signal, and what is transmitted by a shared channel such as PUSCH and PDSCH is called data. This is an example.

The terminal 20 is a communication device with a wireless communication function, such as a smartphone, cellular phone, tablet, wearable terminal, and a communication module for M2M (Machine-to-Machine). As shown in FIG. 1, the terminal 20 utilizes various communication services provided by a wireless communication system by receiving a control signal or data in DL from the base station apparatus 10 and transmitting a control signal or data in UL to the base station apparatus 10. The terminal 20 may be called a UE, and the base station apparatus 10 may be called a gNB.

The terminal 20 can provide carrier aggregation for communicating with the base station apparatus 10 by bundling a plurality of cells (a plurality of CCs (component carriers)). Carrier aggregation uses one PCell (primary cell) and one or more SCells (secondary cells). Also, PUCCH-SCell with PUCCH may be used.

Figure 2:
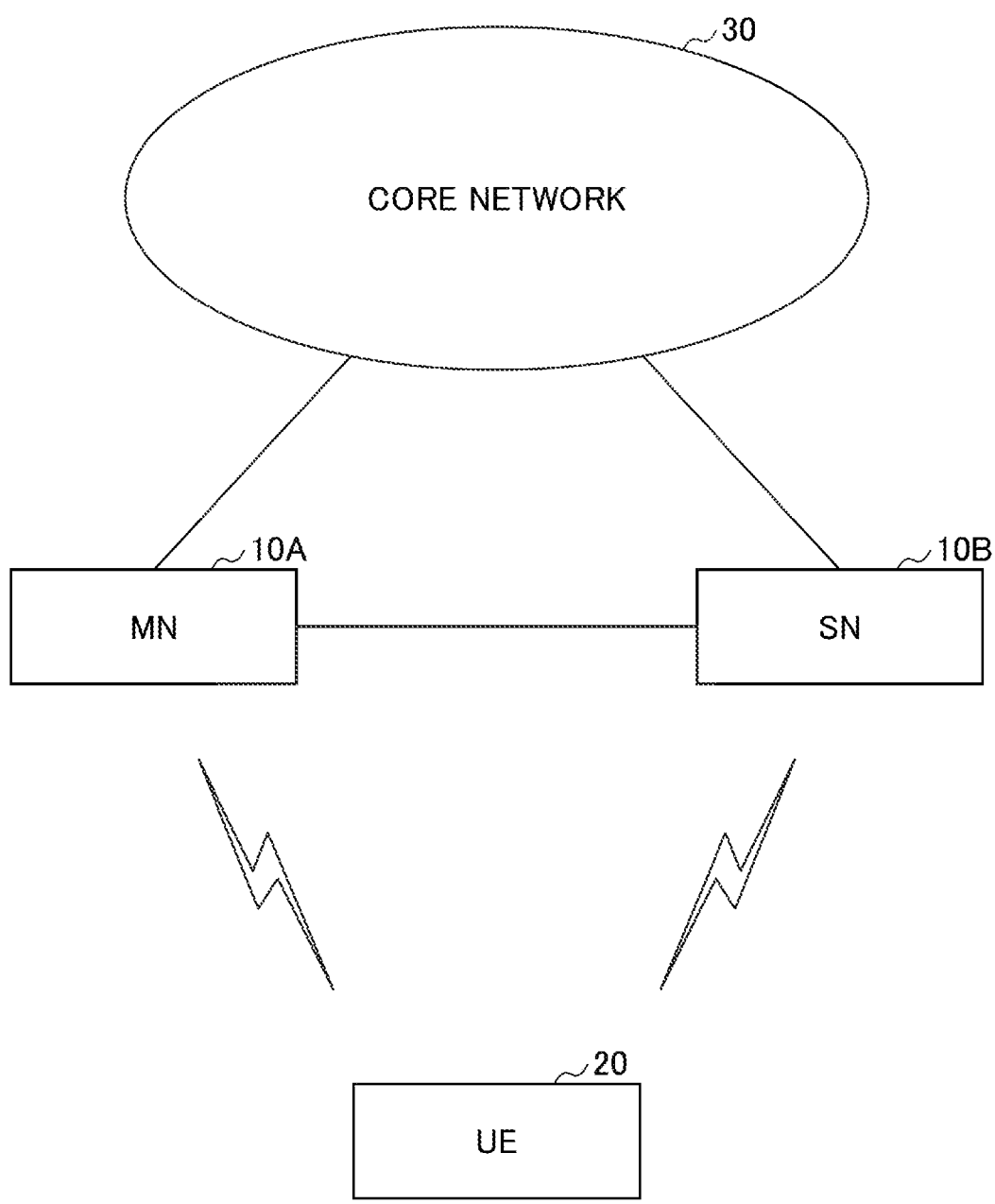
FIG. 2 A diagram for explaining a wireless communication system according to an embodiment of the present invention.

FIG. 2 shows an example of a configuration of a wireless communication system when DC (Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The terminal 20 can communicate with both the base station apparatus 10A and the base station apparatus 10B.

The cell group provided by the base station apparatus 10A that is an MN is called MCG (Master Cell Group), and the cell group provided by the base station apparatus 10B that is an SN is called SCG (Secondary Cell Group). In addition, in DC, the MCG is composed of one Pcell and one or more SCell, and the SCG is composed of one PSCell (Primary SCell) and one or more SCell. Note herein that CC and cells may be used interchangeably. In other words, a CC in the specification and claims may be replaced by a cell.

The processing operation according to this embodiment may be performed in the system configuration shown in FIG. 1, in the system configuration shown in FIG. 2, or may be performed in other system configurations. When DC is executed, multiple CCs subject to scheduling by one DCI may be multiple CCs within a same cell group or multiple CCs across multiple cell groups.

Basic Operation Example

Figure 3:
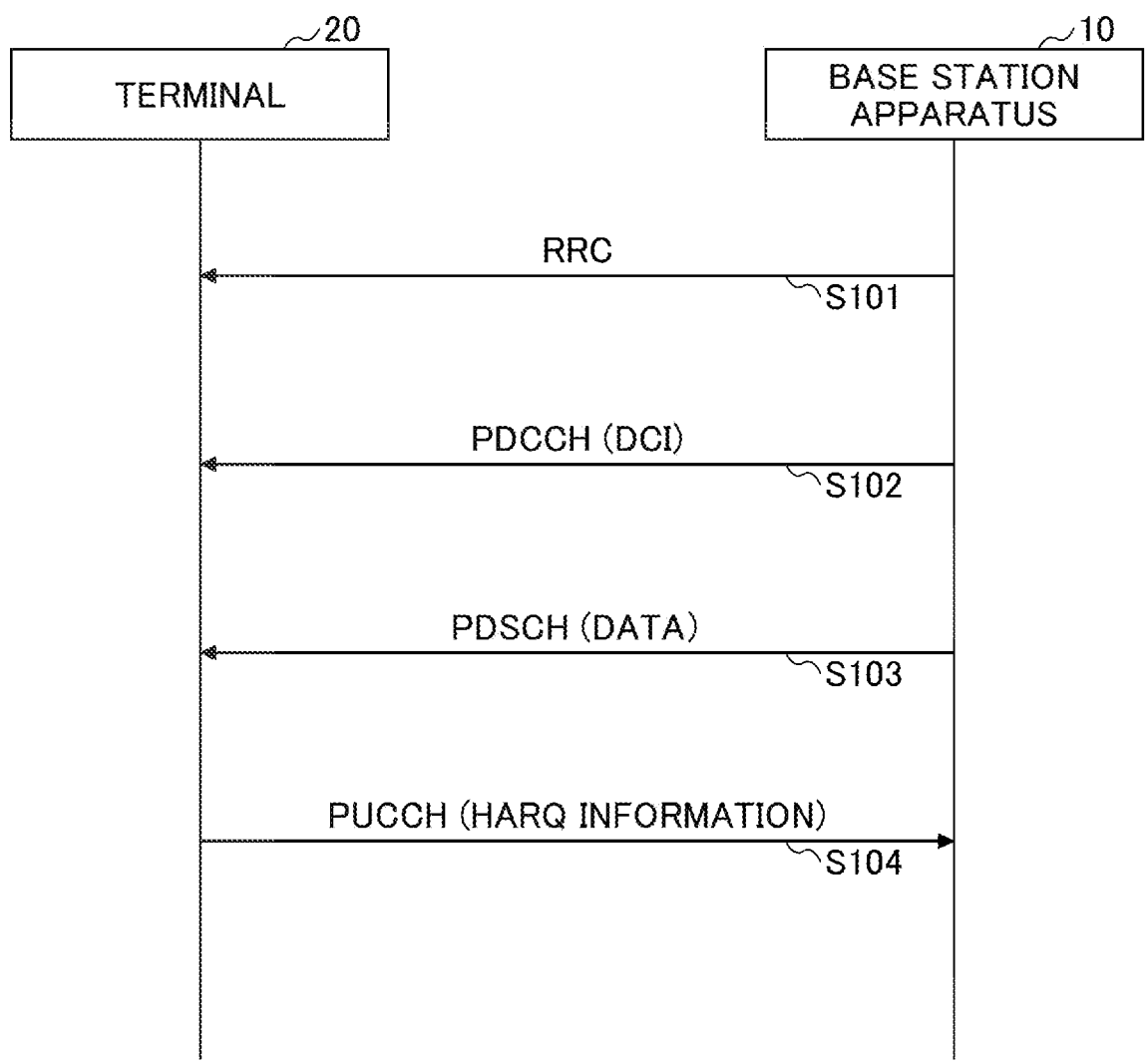
FIG. 3 A diagram for explaining a basic operation of a wireless communication system according to an embodiment of the present invention.

Referring to FIG. 3, a basic operation example of a communication system according to an embodiment of the present invention will be described. This operation is common to Examples 1 to 5 which will be described later.

In S101, the base station apparatus 10 transmits configuration information to the terminal 20 by an RRC message, and the terminal 20 receives the configuration information. This configuration information includes configuration information on a timing from PDSCH reception to HARQ information (DL ACK) transmission, such as dl-DataToUL-ACK (Non-Patent Document 2). In addition, configuration information such as parameters described in each Example described later may be included.

In S102, the base station apparatus 10 transmits a DCI (control information) by a PDCCH and the terminal 20 receives the DCI. This DCI is a DCI that schedules reception of data by a PDSCH of a plurality of CCs. Receiving data by a PDSCH (channel) may be expressed as receiving PDSCH.

In S103, the terminal 20 receives data from the base station apparatus 10 by a PDSCH at each of the multiple CCs in accordance with the DCI received at S102.

In S104, the terminal 20 transmits HARQ information (may be referred to as HARQ feedback) for PDSCH reception of each CC at a timing determined from the value of PDSCH-to-HARQ_feedback timing indicator field included in the DCI.

As described above, in this embodiment, the base station apparatus 10 schedules PDSCH reception of the plurality of CC(s) with one DCI (single DCI) to the terminal 20.

Figure 4:
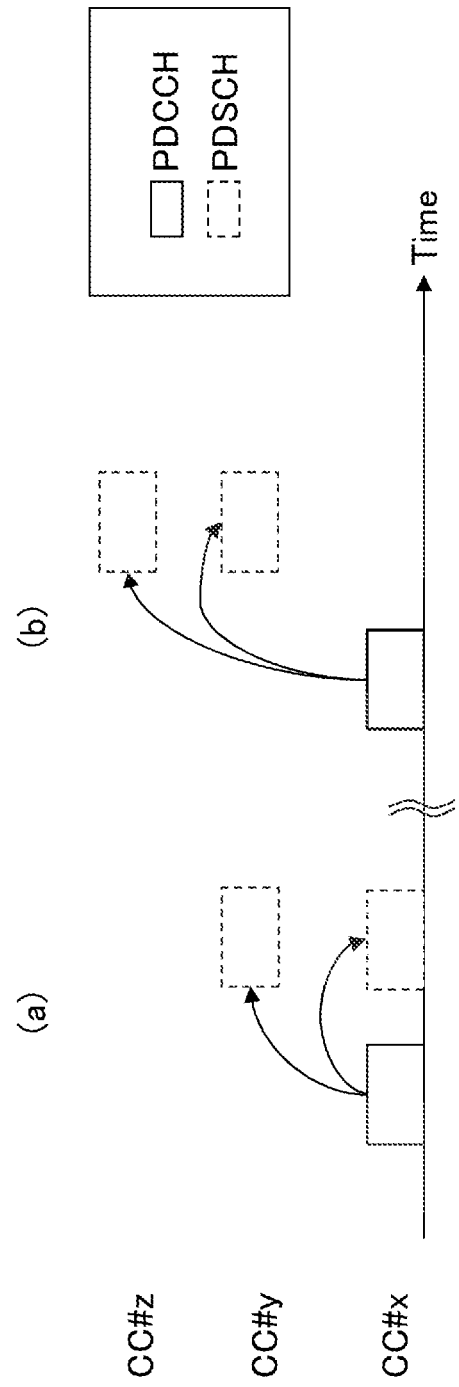
FIG. 4 A diagram showing an example of single DCI scheduling.

An example of scheduling PDSCH reception for multiple CCs by a single DCI is shown in FIG. 4. In the example of FIG. 4(a), the terminal 20 receives a DCI by a PDCCH in CC #x and receives a PDSCH in each of CC #x and CC #y in accordance with scheduling information of the DCI (time and frequency assignment information, etc.).

In the example of FIG. 4(b), the terminal 20 receives a DCI by a PDCCH in CC #x and receives a PDSCH in each of CC #y and CC #z in accordance with scheduling information of the DCI (time and frequency assignment information, etc.).

The number of multiple CCs (cells) that schedule PDSCH reception by a single DCI is not particularly limited, but is, for example, 2. Examples described below are described using 2. However, 2 is only one example. The number of CCs scheduled for PDSCH reception by a single DCI may be three or more.

For example, the single DCI may include scheduling information (such as time and frequency assignment information) for each of multiple CCs scheduling PDSCH reception, or it may include one piece of scheduling information for multiple CCs scheduling PDSCH reception. If one scheduling information is included, for example, the terminal 20 converts one scheduling information into a plurality of pieces of scheduling information in accordance with a predetermined rule (e.g., a calculation formula using a cell index, etc.) and applies them to the plurality of CCs.

PROBLEMS, OVERVIEW OF THE EMBODIMENT

Figure 5:
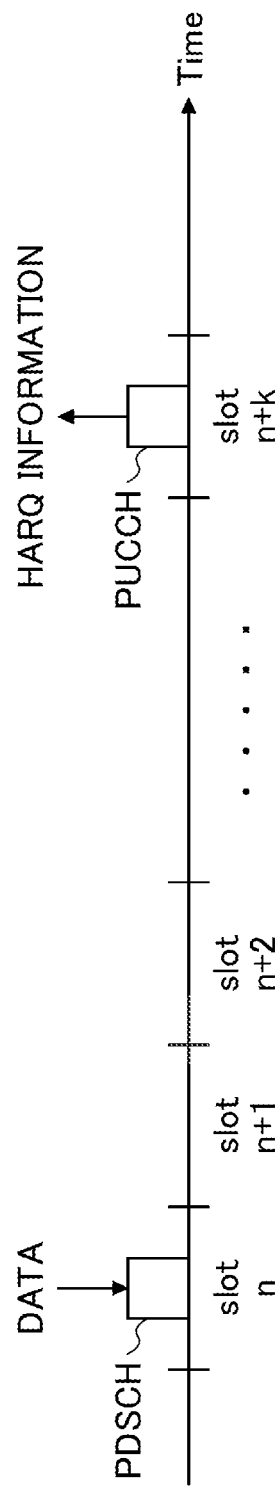
FIG. 5 A diagram for explaining a timing of transmission of HARQ information.

In the prior art described in Non-Patent Document 2 and Non-Patent Document 3, the timing at which the terminal 20 returns HARQ information for PDSCH reception to the base station apparatus 10 (HARQ feedback timing) is a slot after k [slots] counted from a slot where the terminal 20 receives the PDSCH. More specifically, as shown in FIG. 5, if the PDSCH reception is terminated at slot n, HARQ information is transmitted at slot n+k. Such timing may be described as sending HARQ information at a timing after k slots from PDSCH reception.

With respect to the value of k, a list of up to eight values of k is notified from the base station apparatus 10 to the terminal 20 by dl-DataToUL-ACK described in Non-Patent Document 2.

The terminal 20 acquires, from dl-DataToUL-ACK, the value of k corresponding to a value of PDSCH-to-HARQ_feedback timing indicator field (this value may be referred to as "PDSCH-to-HARQ_feedback timing indicator") included in a DCI received from the base station apparatus 10 based on a table 9.2.3-1 described in Non-Patent Document 3 and transmits HARQ information at the timing of the slot n+k as shown in FIG. 5.

As for HARQ feedback timing for scheduling PDSCH reception of multiple CCs using a single DCI, it is assumed to use the same technology as described in Non-Patent Document 2 and Non-Patent Document 3.

For example, when scheduling PDSCH reception in each of CC #x and CC #y by a single DCI, it can be considered that the terminal 20 may apply k specified by PDSCH-to-HARQ_feedback timing indicator in the single DCI to each of HARQ feedback timing for PDSCH reception in CC #x and HARQ feedback timing for PDSCH reception in CC #y.

However, if SCS (subcarrier spacing) of CC #x and CC #y are different, the length of one slot (called slot length) is different between CC #x and CC #y, so that k slots do not have the same time length.

Figure 6:
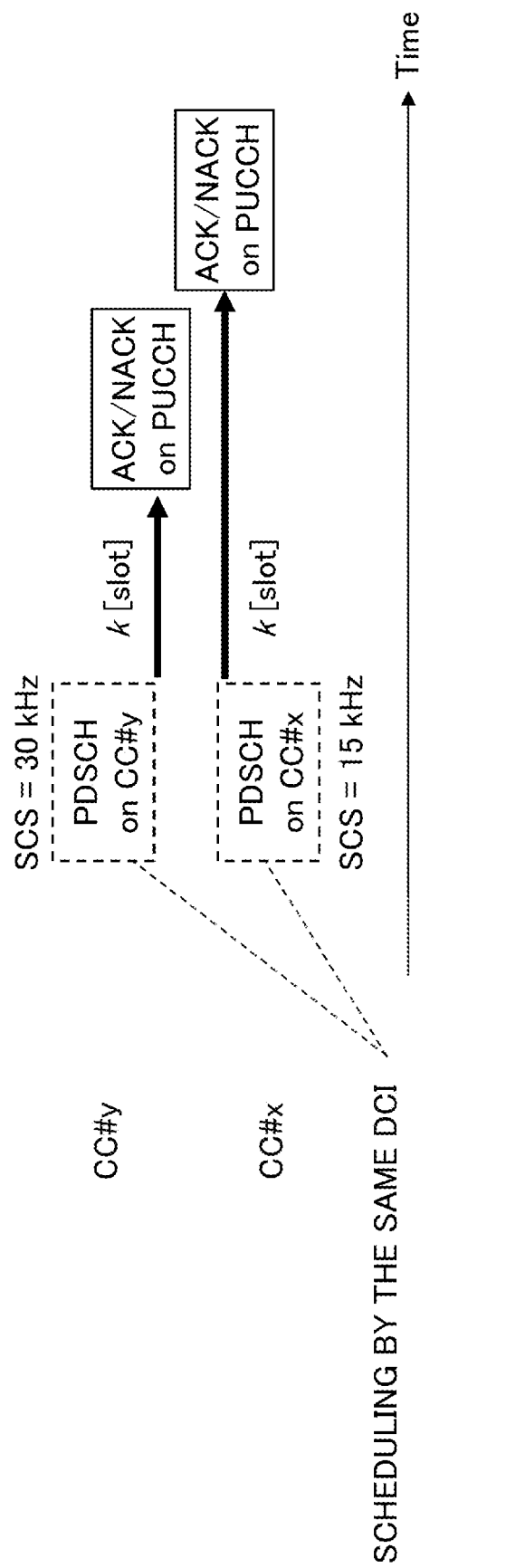
FIG. 6 A diagram for explaining a problem.

Therefore, for example, as shown in FIG. 6, the timing of returning HARQ information by PUCCH is different between CC #x and CC #y. If the timing of returning HARQ information is different between CC #x and CC #y, use of PUCCH resources is inefficient because the terminal 20 must return HARQ information twice.

Figure 7:
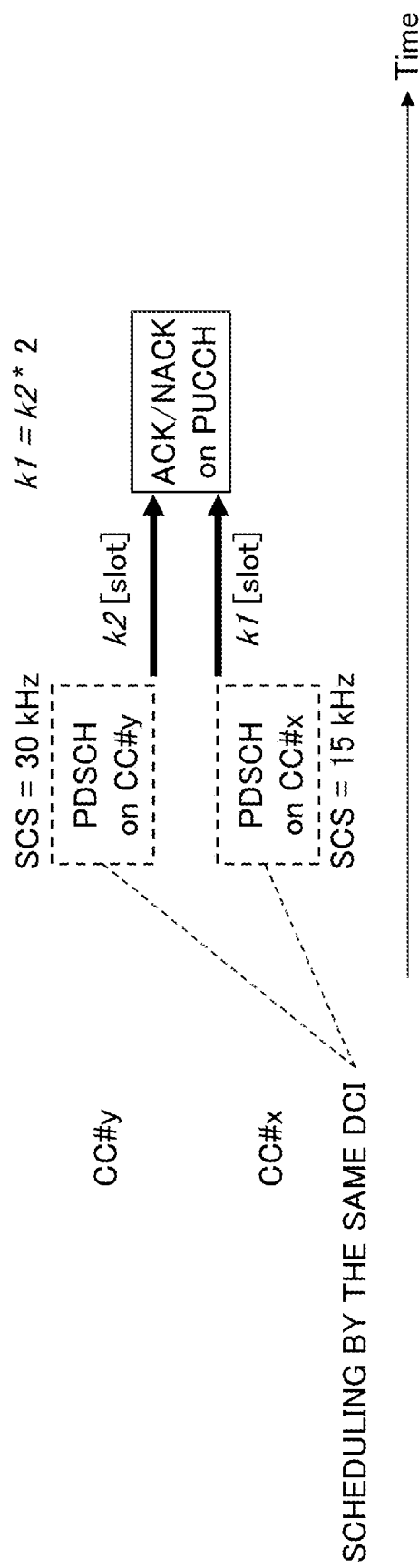
FIG. 7 A diagram for explaining an example of a terminal's operation.

Accordingly, in the present embodiment, when PDSCH reception of multiple CCs is scheduled with a single DCI, as shown in FIG. 7, the terminal 20 can transmit HARQ information for PDSCH reception of each CC at the same timing (that is, in the same slot) between the multiple CCs.

In the operation in which the terminal 20 transmits HARQ information at the same timing in the multiple CCs, for example, the terminal 20 transmits HARQ information for PDSCH reception at CC #x and HARQ information for PDSCH reception at CC #y collectively (for example, using consecutive bit sequence) by a PUCCH of CC #x (or a PUCCH of CC #y).

In the example of FIG. 7, SCS of CC #x is 15 kHz and SCS of CC #y is 30 kHz. Therefore, the slot length in CC #y is ½ of the slot length in CC #x. Therefore, as shown in FIG. 7, when the timing for returning HARQ information is the same for CC #x and CC #y, there is a relationship of k1=k2×2 between the slot length k2 from the receipt of PDSCH at CC #y to the transmission of HARQ information and the slot length k1 from the receipt of PDSCH at CC #x to the transmission of HARQ information.

In the case of scheduling PDSCH reception in multiple CCs with a single DCI, a technique of enabling the terminal 20 to transmit HARQ information for PDSCH reception of each CC at the same timing between multiple CCs (i.e., in the same slot) will be described with reference to Examples 1 to 5. Any one or more of Examples 1 through 5 may be implemented in any combination.

In the description of Examples 1 to 5, the step number in the basic operation example shown in FIG. 3 is referred to as appropriate. Also, FIG. 7 which shows that HARQ information is transmitted at the same timing between multiple CCs will be referred to as necessary.

Example 1

In Example 1, in S102 of FIG. 3, the base station apparatus 10 transmits HARQ feedback timing indicator for PDSCH reception to the terminal 20 by including it in DCI, for each CC, that schedules PDSCH reception of the multiple CCs. For convenience, "HARQ feedback timing indicator" may be described as "indicator" below.

For example, the single DCI that schedules PDSCH reception of two CCs includes indicator A and indicator B.

In Example 1, the terminal 20 receiving a single DCI scheduling PDSCH reception of multiple CCs assumes that HARQ feedback timing for each of PDSCH receptions of multiple CCs is indicated by the single DCI. That is, the terminal 20 decodes the single DCI assuming that the single DCI contains an indicator for each of the multiple CCs to be scheduled.

For example, when an indicator A is stored in field A and an indicator B is stored in field B in a single DCI, the terminal 20 reads the indicator A from the bit position of field A and reads the indicator B from the bit position of field B.

An identifier such as A and B identifying the indicator may be called an indicator index. For example, in a single DCI with sequential bits, field A, which stores indicator A, is at a bit position before field B, which stores indicator B. Thus, the indicator index may correspond to the order of bit position in the single DCI, or it may correspond to any other.

For example, the terminal 20 retains information of a table shown in FIG. 8 (a table modified from Table 9.2.3-1 described in Non-Patent Document 3), acquires the value of k corresponding to the indicator A from dl-DataToUL-ACK by referring to the information of the table, and acquires the value of k corresponding to the indicator B from dl-DataToUL-ACK.

For example, suppose that the single DCI received by the terminal 20 is a DCI for scheduling PDSCH reception of CC #x and PDSCH reception of CC #y as shown in FIG. 7, and that the HARQ feedback timing indicator for PDSCH reception of CC #x is an indicator A, and that the HARQ feedback timing indicator for PDSCH reception of CC #y is an indicator B.

In this case, in the example of FIG. 7, the terminal 20 acquires k1 by the indicator A and acquires k2 by the indicator B. In Example 1, the base station apparatus 10 sets the indicator A and the indicator B to the single DCI so that the HARQ information is transmitted at the same timing by the k1 and k2. Therefore, as shown in FIG. 7, the terminal 20 can transmit HARQ information for PDSCH reception of CC #x and HARQ information for PDSCH reception of CC #y at the same timing. The base station apparatus 10 receives HARQ information transmitted from the terminal 10.

In Example 1, HARQ feedback timing (up to eight candidates) of granularity similar to that of Rel-15/16 can be indicated for each of CCs.

The terminal 20 may, for example, determine correspondence between each indicator included in the single DCI and each CC scheduled by the single DCI in the manner described in Examples 1-1 to 1-4 below. Examples 1-1 to 1-4 may be implemented in any combination.

Example 1-1

Information indicating correspondence between each indicator included in a single DCI and each CC that is a target for scheduling by the single DCI is configured from the base station apparatus 10 to the terminal 20 by RRC signaling (or MAC signaling). For example, information such as {indicator A, indicator B, indicator C}={CC #x, CC #y, CC #z} is configured from the base station apparatus 10 to the terminal 20. The "CC #x" or the like may be an index of CC or an index of a cell having the CC. In this case, for example, the terminal 20 determines that the indicator A read from the field A storing the indicator A corresponds to CC #x.

A plurality of pieces of correspondence information may be configured from the base station apparatus 10 to the terminal 20 by RRC signaling (or MAC signaling), and then one correspondence information may be activated from the base station apparatus 10 to the terminal 20 by MAC signaling (or RRC signaling or DCI).

In addition, information indicating correspondence between each indicator included in the single DCI and each CC subject to scheduling by the single DCI may be specified in the specification, and the base station apparatus 10 and the terminal 200 may determine correspondence between each indicator included in the single DCI and each CC subject to scheduling by the single DCI in accordance with the description in the specification.

Example 1-2

The terminal 20 (and the base station apparatus 10) determines that indicator index is associated with CC index (which may be cell index) in an ascending (or descending) order.

For example, suppose that indicator A and indicator B are notified by a single DCI, and that indexes of CCs for scheduling are #0 and #3.

In this case, when the indicator index and the CC index correspond in an ascending order, the terminal 20 (and the base station apparatus 10) determines that the indicator A corresponds to the CC index #0 and the indicator B corresponds to the CC index #3. When the indicator index and the CC index correspond in a descending order, the terminal 20 (and the base station apparatus 10) determines that the indicator B corresponds to the CC index #0 and the indicator A corresponds to the CC index #3.

Examples 1-3

The terminal 20 (and the base station apparatus 10) determines that indicator index and SCS of CC correspond in an ascending (or descending) order.

For example, suppose that a single DCI notifies indicator A and indicator B and that SCS for two CCs to be scheduled is 15 kHz and 30 kHz.

In this case, when the indicator index and the SCS of CC correspond in an ascending order, the terminal 20 (and the base station apparatus 10) determines that the indicator A corresponds to the CC (SCS=15 kHz) and the indicator B corresponds to the CC (SCS=30 kHz). When the index and the SCS of CC correspond in a descending order, the terminal 20 (and the base station apparatus 10) determines that the indicator A corresponds to the CC (SCS=30 kHz) and the indicator B corresponds to the CC (SCS=15 kHz).

Examples 1-4

The terminal 20 (and the base station apparatus 10) determines that indicator index is associated with "PCell, PSCell, PUCCH-SCell" and a cell other than "PCell, PSCell, PUCCH-SCell".

For example, suppose that earlier (smaller) indicator index corresponds to CC of "PCell, PSCell, PUCCH-SCell" and that later (larger) indicator index corresponds to CC of cell other than "PCell, PSCell, PUCCH-SCell".

In this case, for example, suppose that the single DCI notifies indicator A and indicator B, and that one CC of two CCs to be scheduled is PCell (or PSCell or PUCCH-SCell) and the other CC is CC of a cell other than "PCell, PSCell, PUCCH-SCell".

In this case, the terminal 20 (and the base station apparatus 10) determines that the indicator A corresponds to the CC of PCell (or PSCell or PUCCH-SCell) and the indicator B corresponds to the CC of cells other than "PCell, PSCell, or PUCCH-SCell".

It is an example that the indicator index is associated with "PCell, PSCell, PUCCH-SCell" and cell other than "PCell, PSCell, PUCCH-SCell". Association may be made based on cell type of aspect other than aspect (cell having PUCCH) of cell type of "PCell, PSCell, PUCCH-SCell".

Example 2

In Example 2, when the terminal 20 receives a single DCI for scheduling PDSCH reception of multiple CCs from the base station apparatus 10, the terminal 20 assumes that the single DCI includes one indicator. That is, in Example 2, the base station apparatus 10 includes one indicator in the single DCI for scheduling the PDSCH reception of multiple CCs and transmits it to the terminal 20.

The terminal 20 determines each HARQ feedback timing (i.e., a value of k) for PDSCH reception of multiple CCs scheduled by the single DCI based on one indicator read from the received single DCI. As for a method for determining k, there are variations described in Example 2A and Example 2B.

Example 2A

In Example 2A, as an example, the terminal 20 retains information of a table shown in FIG. 9 (a table modified from Table 9.2.3-1 disclosed in Non-Patent Document 3). This table corresponds to a case where a bit size of the indicator is up to 3. This table is also an example where the number of CCs to be scheduled by a single DCI is 2. One CC is represented by CC #x and the other CC is represented by CC #y.

For example, if the indicator is 3 bits, '000' indicates that the value of k for CC #x is the first value in dl-DataToUL-ACK and the value of k for CC #y is the first value in dl-DataToUL-ACK. Other indicator values are also shown in the table in FIG. 9.

As an example, suppose that PDSCH reception of CC #0 and CC #3 is scheduled for the terminal 20 by a single DCI, and that CC #0 corresponds to CC #x of the table shown in FIG. 9 and CC #3 corresponds to CC #y of the table shown in FIG. 9.

In this case, the terminal 20 which receives the single DCI reads one indicator from the single DCI and determines k1 for PDSCH reception at CC #x (CC #0) and k2 for PDSCH reception at CC #y (CC #3) corresponding to the indicator referring to the table of FIG. 9.

In Example 2, the base station apparatus 10 sets an indicator to a single DCI so that HARQ information is transmitted at the same timing by k1 and k2. Therefore, as shown in FIG. 7, the terminal 20 can transmit HARQ information for PDSCH reception of CC #x and HARQ information for PDSCH reception of CC #y at the same timing. The base station apparatus 10 receives HARQ information transmitted from the terminal 20.

The bit size (X [bit]) of the indicator included in the single DCI may be configured from the base station apparatus 10 to the terminal 20 by RRC signaling or MAC signaling. If such a configuration is made, X may be greater than 3. Alternatively, the terminal 20 may determine X by the size (number of entries, how many values) of the dl-DataToUL-ACK received from the base station apparatus 10 via RRC signaling. For example, if there are 16 values in dl-DataToUL-ACK, the terminal 20 determines that X=4.

When the bit size of the indicator is up to 4, as an example, the terminal 20 retains information of a table shown in FIG. 10 (a table modified from Table 9.2.3-1 disclosed in Non-Patent Document 3). This table is an example where the number of CCs to be scheduled by a single DCI is 2. One CC is represented by CC #x and the other CC is represented by CC #y.

For example, if the indicator is 4 bits, '0000' indicates that the value of k for CC #x is the first value in dl-DataToUL-ACK and the value of k for CC #y is the first value in dl-DataToUL-ACK. Other indicator values are also shown in the table in FIG. 10.

As an example, suppose that PDSCH reception of CC #0 and CC #3 is scheduled for the terminal 20 by a single DCI, and that CC #0 corresponds to CC #x of the table shown in FIG. 10 and CC #3 corresponds to CC #y of the table shown in FIG. 10.

In this case, the terminal 20 which receives the single DCI reads one indicator from the single DCI and determines k1 for PDSCH reception at CC #x (CC #0) and k2 for PDSCH reception at CC #y (CC #3) corresponding to the indicator referring to the table of FIG. 10.

In Example 2, the base station apparatus 10 sets an indicator to a single DCI so that HARQ information is transmitted at the same timing by k1 and k2. Therefore, as shown in FIG. 7, the terminal 20 can transmit HARQ information for PDSCH reception of CC #x and HARQ information for PDSCH reception of CC #y at the same timing.

Example 2B

In Example 2B, divided information obtained by dividing the indicator (bit string) contained in the single DCI at a certain bit position is associated with each CC subject to scheduling of the single DCI.

For example, suppose that the number of CCs for scheduling by a single DCI is 2, and that one CC is CC #x and the other CC is CC #y. As an example, the terminal 20 determines that upper Y bits of the indicator read from the single DCI received from the base station apparatus 10 is the indicator (or the value of k) of the HARQ feedback timing for PDSCH reception in CC #x, and determines that the remaining bits (bits excluding the upper Y bits from the indicator read from the single DCI) is the indicator (or the value of k) of the HARQ feedback timing for PDSCH reception in CC #y.

In this case, the base station apparatus 10 sets the upper Y bits of the indicator to be included in the single DCI as the indicator (or value of k) of HARQ feedback timing for PDSCH reception in CC #x, and sets the remaining bits as the indicator (or value of k) of HARQ feedback timing for PDSCH reception in CC #y.

The terminal 20 may determine that lower Y bits of the indicator read from the single DCI received from the base station apparatus 10 is the indicator (or the value of k) of HARQ feedback timing for PDSCH reception in CC #x, and determine that the remaining bits (the bits obtained by subtracting the lower Y-bits from the indicator read from the single DCI) is the indicator (or the value of k) of HARQ feedback timing for PDSCH reception in CC #y.

In this case, the base station apparatus 10 sets the lower Y bits of the indicator to be included in the single DCI as the indicator (or value of k) of HARQ feedback timing for PDSCH reception in CC #x, and sets the remaining bits as the indicator (or value of k) of HARQ feedback timing for PDSCH reception in CC #y.

The value of Y described above may be configured (or activated) from the base station apparatus 10 to the terminal 20 by RRC signaling or MAC signaling, or may be predetermined by a specification document, etc., and the value may be retained by the terminal 20 (and the base station apparatus 10).

The terminal 20 may determine the value of k corresponding to the upper Y bits (or lower Y bits)/remaining bits of the indicator read from the single DCI from the table 9.2.3-1 disclosed in Non-Patent Document 3 or may determine the value from a table other than the table 9.2.3-1 disclosed in Non-Patent Document 3.

The terminal 20 may, for example, determine correspondence between CC #x and CC #y described in Examples 2A and 2B and each CC to be scheduled by the single DCI in the manner described in Examples 2-1 to 2-4 below. Examples 2-1 to 2-4 may be implemented in any combination.

Example 2-1

Information indicating correspondence between CC #x and CC #y, and each CC for scheduling by the single DCI is configured from the base station apparatus 10 to the terminal 20 by RRC signaling (or MAC signaling). For example, information such as {CC #x, CC #y}={CC #0, CC #3} is configured from the base station apparatus 10 to the terminal 20. The "CC #x" or the like may be an index of CC or an index of cell having the CC.

A plurality of pieces of correspondence information may be configured from the base station apparatus 10 to the terminal 20 by RRC signaling (or MAC signaling), and then one correspondence information may be activated from the base station apparatus 10 to the terminal 20 by MAC signaling (or RRC signaling or DCI).

Further, information indicating correspondence between CC #x and CC #y, and each CC that is the subject of scheduling by a single DCI may be specified in the specification, and the base station apparatus 10 and the terminal 20 may determine the correspondence between CC #x and CC #y, and each CC that is the subject of scheduling by a single DCI in accordance with the description of the specification.

Example 2-2

The terminal 20 (and the base station apparatus 10) determines that CC #x and CC #y are associated with CC index (or cell index) of the CC for scheduling in an ascending (or descending) order.

For example, suppose that the indices of CC for scheduling are #0 and #3. In this case, when CC #x, CC #y, and CC index correspond to each other in an ascending order, the terminal 20 (and the base station apparatus 10) determines that CC #x corresponds to CC index #0 and CC #y corresponds to CC index #3. When CC #x, CC #y, and CC index correspond in a descending order, the terminal 20 (and the base station apparatus 10) determines that CC #y corresponds to CC index #0 and CC #x corresponds to CC index #3.

Example 2-3

The terminal 20 (and the base station apparatus 10) determines that CC #x and CC #y correspond to SCS of CC to be scheduled in an ascending (or descending) order.

For example, suppose that SCS for two CCs to be scheduled is 15 kHz and 30 kHz.

In this case, when CC #x, CC #y, and SCS correspond in an ascending order, the terminal 20 (and the base station apparatus 10) determines that CC #x corresponds to CC (SCS=15 kHz) and CC #y corresponds to CC (SCS=30 kHz). When CC #x, CC #y, and SCS correspond in a descending order, the terminal 20 (and the base station apparatus 10) determines that CC #x corresponds to CC (SCS=30 kHz) and CC #y corresponds to CC (SCS=15 kHz).

Examples 2-4

The terminal 20 (and the base station apparatus 10) determines that CC #x and CC #y are associated with "PCell, PScell, PUCCH-SCell" and cell other than "PCell, PScell, PUCCH-SCell".

For example, suppose CC #x corresponds to CC of "Cell, PSCell, PUCCH-SCell" and CC #y corresponds to CC of cells other than "Cell, PSCell, PUCCH-SCell".

In this case, for example, one CC of two CCs to be scheduled is PCell (or PSCell or PUCCH-SCell) and the other CC is CC of a cell other than "PCell, PSCell, PUCCH-SCell".

In this case, the terminal 20 (and the base station apparatus 10) determines that CC #x corresponds to CC of PCell (or PSCell PUCCH-SCell) and CC #y corresponds to CC of a cell other than "PCell, PSCell, PUCCH-SCell".

Note that mapping may be made based on cell type of aspect other than aspect of cell type (cells with PUCCH) such as "PCell, PSCell, and PUCCH-SCell."

In Example 2, HARQ feedback timing can be indicated for each of multiple CCs with a DCI overhead equivalent to Rel-15/16. In addition, HARQ feedback timing can be indicated flexibly for each CC.

Example 3

In Example 3, similarly to Example 2, when the terminal 20 receives a single DCI for scheduling PDSCH reception of multiple CCs from the base station apparatus 10, the terminal 20 assumes that the single DCI includes one indicator. That is, also in Example 3, the base station apparatus 10 includes one indicator in the single DCI for scheduling PDSCH reception of multiple CCs and transmits it to the terminal 20.

The terminal 20 determines each HARQ feedback timing for PDSCH reception of multiple CCs scheduled by the single DCI based on one indicator read from the received single DCI and another parameter.

The parameter may be configured (or activated) from the base station apparatus 10 to the terminal 20 by RRC signaling or MAC signaling, or may be determined from yet another parameter (e.g., SCS of a target CC), or the value specified in the specification or the like may be previously retained by the terminal 20 (and the base station apparatus 10).

For example, when the number of CCs scheduled by the single DCI is 2 (when they are CC #x and CC #y), the terminal 20 determines HARQ feedback timing (value of k) of CC #x from the indicator read from the single DCI, and calculates HARQ feedback timing of CC #y from an equation using k determined for CC #x and a parameter.

When the terminal 20 determines HARQ feedback timing (value of k) of CC #x from the indicator read from the single DCI, the table 9.2.3-1 described in Non-Patent Document 3 may be used, or information other than the table 9.2.3-1 described in Non-Patent Document 3 may be used.

An example of the above calculation is described. For example, the terminal 20 calculates HARQ feedback timing of CC #y as k+s[slot].

Figure 11:
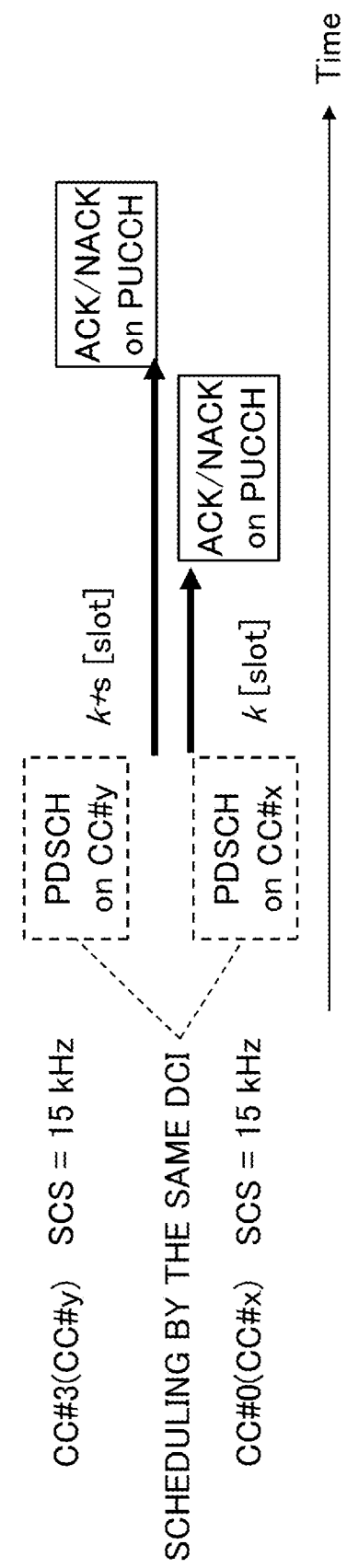
FIG. 11 A diagram for explaining an example of a terminal's operation.

Assuming that multiple CCs scheduled by a single DCI are CC #0 (SCS=15 kHz) and CC #3 (SCS=15 kHz), and that CC #0 corresponds to CC #x and CC #3 corresponds to CC #y, FIG. 11 shows an example where the terminal 20 calculates HARQ feedback timing of CC #y as k+s[slot].

In the example of FIG. 11, s=1 is configured to the terminal 20. In this case, as shown in FIG. 11, the timing of HARQ information transmission in CC #3 is one slot later than the timing of HARQ information transmission in CC #0. As described above, from the viewpoint of effective utilization of PUCCH resources, it is preferable that s=0 in this example. However, when it is desired to have different timing for transmission of HARQ information between multiple CCs for some reason, the method of Example 3 can be used as shown in FIG. 11.

The terminal 20 may calculate HARQ feedback timing of CC #y as n×k [slot].

Figure 12:
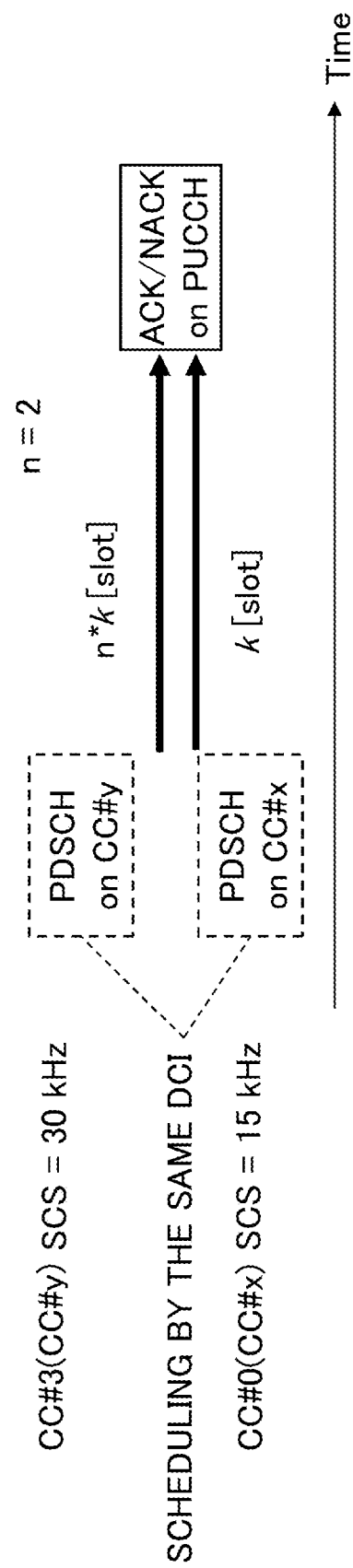
FIG. 12 A diagram for explaining an example of a terminal's operation.

Assuming that multiple CCs scheduled by a single DCI are CC #0 (SCS=15 kHz) and CC #3 (SCS=30 kHz), and that CC #0 corresponds to CC #x and CC #3 corresponds to CC #y, FIG. 12 shows an example where the terminal 20 calculates HARQ feedback timing of CC #y as n×k [slot].

In the example of FIG. 12, n=2 is configured to the terminal 20. In this case, as illustrated in FIG. 12, the timing of HARQ information transmission in CC #0 and the timing of HARQ information transmission in CC #3 are the same, and the terminal 20 can transmit HARQ information in CC #0 and HARQ information in CC #3 at the same timing.

The value n=2 may be a value received from the base station apparatus 10 by the terminal 20 as configuration information, or a value determined by the terminal 20 based on SCS of CC #0 and SCS of CC #3. For example, assuming that the slot length is inversely proportional to the SCS value, it can be calculated as n=(SCS of CC corresponding to CC #y)/(SCS of CC corresponding to CC #x).

The terminal 20 may, for example, determine correspondence between CC #x and CC #y described above, and each CC to be scheduled by the single DCI in the manner described in Examples 3-1 to 3-4 below. Examples 3-1 to 3-4 may be implemented in any combination.

Example 3-1

Information indicating correspondence between CC #x and CC #y, and each CC for scheduling by the single DCI is configured from the base station apparatus 10 to the terminal 20 by RRC signaling (or MAC signaling). For example, information such as {CC #x, CC #y}={CC #0, CC #3} is configured from the base station apparatus 10 to the terminal 20. The "CC #x" or the like may be an index of CC or an index of cell having the CC.

A plurality of pieces of correspondence information may be configured from the base station apparatus 10 to the terminal 20 by RRC signaling (or MAC signaling), and then one correspondence information may be activated from the base station apparatus 10 to the terminal 20 by MAC signaling (or RRC signaling or DCI).

Further, information indicating correspondence between CC #x and CC #y, and each CC that is the subject of scheduling by a single DCI may be specified in the specification, and the base station apparatus 10 and the terminal 20 may determine the correspondence between CC #x and CC #y, and each CC that is the subject of scheduling by a single DCI in accordance with the description of the specification.

Example 3-2

The terminal 20 (and the base station apparatus 10) determines that CC #x and CC #y are associated with CC index (or cell index) of the CC for scheduling in an ascending (or descending) order.

For example, suppose that the indices of CC for scheduling are #0 and #3. In this case, when CC #x, CC #y, and CC index correspond to each other in an ascending order, the terminal 20 (and the base station apparatus 10) determines that CC #x corresponds to CC index #0 and CC #y corresponds to CC index #3. When CC #x, CC #y, and CC index correspond in a descending order, the terminal 20 (and the base station apparatus 10) determines that CC #y corresponds to CC index #0 and CC #x corresponds to CC index #3.

Example 3-3

The terminal 20 (and the base station apparatus 10) determines that CC #x and CC #y correspond to SCS of CC to be scheduled in an ascending (or descending) order.

For example, suppose that SCS for two CCs to be scheduled is 15 kHz and 30 kHz.

In this case, when CC #x, CC #y, and SCS correspond in an ascending order, the terminal 20 (and the base station apparatus 10) determines that CC #x corresponds to CC (SCS=15 kHz) and CC #y corresponds to CC (SCS=30 kHz). When CC #x, CC #y, and SCS correspond in a descending order, the terminal 20 (and the base station apparatus 10) determines that CC #x corresponds to CC (SCS=30 kHz) and CC #y corresponds to CC (SCS=15 kHz).

Examples 3-4

The terminal 20 (and the base station apparatus 10) determines that CC #x and CC #y are associated with "PCell, PScell, PUCCH-SCell" and cell other than "PCell, PScell, PUCCH-SCell".

For example, suppose that CC #x corresponds to CC of "Cell, PSCell, PUCCH-SCell" and CC #y corresponds to CC of cells other than "PCell, PSCell, PUCCH-SCell".

In this case, for example, one CC of two CCs to be scheduled is PCell (or PSCell or PUCCH-SCell) and the other CC is CC of a cell other than "PCell, PSCell, PUCCH-SCell".

In this case, the terminal 20 (and the base station apparatus 10) determines that CC #x corresponds to CC of PCell (or PSCell PUCCH-SCell) and CC #y corresponds to CC of a cell other than "PCell, PSCell, PUCCH-SCell".

Note that mapping may be made based on cell type of aspect other than aspect of cell type (cells with PUCCH) such as "PCell, PSCell, and PUCCH-SCell."

In Example 3, HARQ feedback timing can be indicated for each of multiple CCs with a DCI overhead equivalent to Rel-15/16.

Example 4

In Example 4, similar to Example 3, when the terminal 20 receives a single DCI for scheduling PDSCH reception of multiple CCs from the base station apparatus 10, the terminal 20 assumes that the single DCI includes one indicator. That is, also in Example 4, the base station apparatus 10 includes one indicator in the single DCI for scheduling PDSCH reception of multiple CCs and transmits it to the terminal 20.

The terminal 20 determines each HARQ feedback timing for PDSCH reception of multiple CCs scheduled by the single DCI based on one indicator read from the received single DCI and another parameter.

The parameter may be configured (or activated) from the base station apparatus 10 to the terminal 20 by RRC signaling or MAC signaling, or may be determined from yet another parameter (e.g., SCS of a target CC), or the value specified in the specification or the like may be previously retained by the terminal 20 (and the base station apparatus 10). Examples 4-1, 4-2, and 4-3 will be described below as specific examples. In Example 4-1, the parameter is information indicating "SCS is the smallest"; in Example 4-2, the parameter is information indicating "SCS is the largest"; and in Example 4-3, the parameter is information indicating "specific SCS". The "SCS" may be the above parameter.

Example 4-1

First, the terminal 20 determines k from one indicator included in the single DCI for scheduling PDSCH reception of multiple CCs received from the base station apparatus 10. In determining k, the table 9.2.3-1 described in Non-Patent Document 3 may be used, or information other than the table 9.2.3-1 described in Non-Patent Document 3 may be used.

Next, the terminal 20 determines a timing after k [slot] counted by slot of a CC having the smallest SCS of the multiple CCs in which PDSCH reception is scheduled by the single DCI as a common HARQ feedback timing of the multiple CCs.

Figure 13:
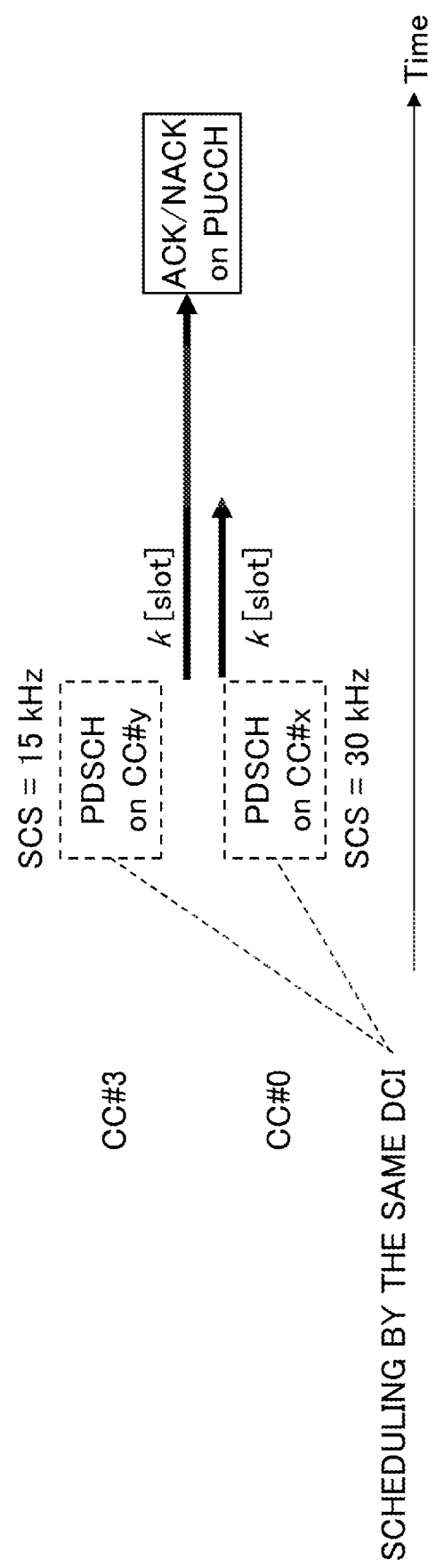
FIG. 13 A diagram for explaining an example of a terminal's operation.

FIG. 13 shows an example where CC #0 (SCS=30 kHz) and CC #3 (SCS=15 kHz) are target CCs scheduled by a single DCI.

In the example of FIG. 13, CC with the smallest SCS of the multiple CCs is CC #3. Accordingly, after receiving PDSCH at CC #3, the terminal 20 transmits HARQ information for PDSCH reception of CC #0 and HARQ information for PDSCH reception of CC #3 collectively k slots after CC #3. PUCCH for transmitting HARQ information for PDSCH reception of CC #0 and HARQ information for PDSCH reception of CC #3 together can be PUCCH of CC #0, PUCCH of CC #3, or PUCCH of other CC (cell).

Example 4-2

First, the terminal 20 determines k from one indicator included in the single DCI for scheduling PDSCH reception of multiple CCs received from the base station apparatus 10. In determining k, the table 9.2.3-1 described in Non-Patent Document 3 may be used, or information other than the table 9.2.3-1 described in Non-Patent Document 3 may be used.

Next, the terminal 20 determines a timing after k [slot] counted in slots of a CC having the largest SCS of the multiple CCs scheduled for PDSCH reception by the single DCI as HARQ feedback timing common to the multiple CCs.

Figure 14:
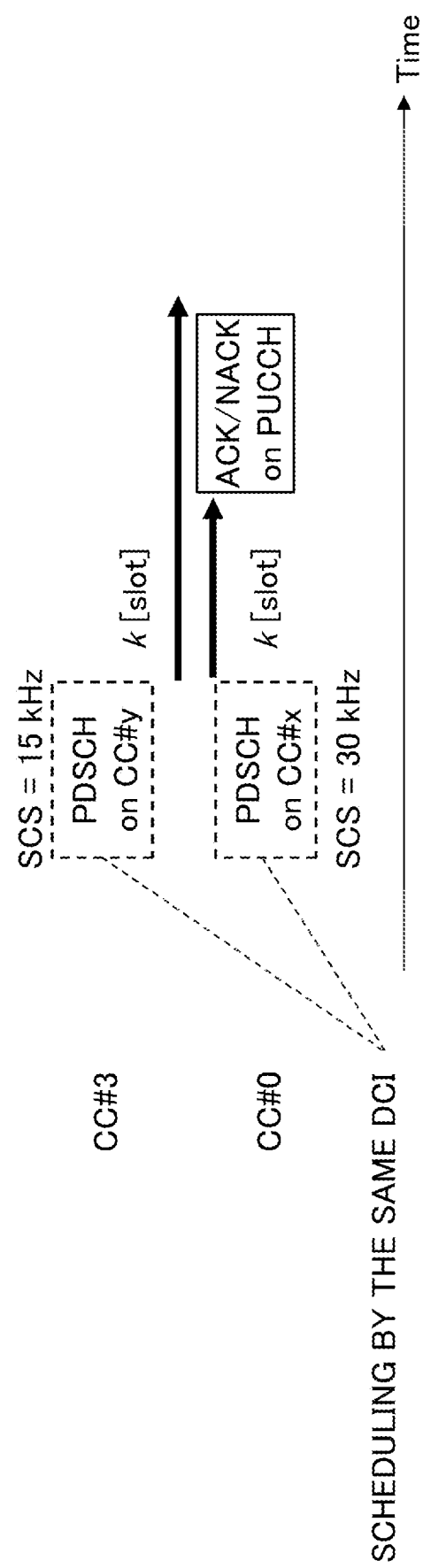
FIG. 14 A diagram for explaining an example of a terminal's operation.

FIG. 14 shows an example where CC #0 (SCS=30 kHz) and CC #3 (SCS=15 kHz) are target CCs scheduled by a single DCI.

In the example of FIG. 14, a CC with the largest SCS of the multiple CCs is CC #0. Therefore, after receiving PDSCH at CC #0, the terminal 20 transmits HARQ information for PDSCH reception of CC #0 and HARQ information for PDSCH reception of CC #3 at the same timing k slots after in CC #0. PUCCH for transmitting HARQ information for PDSCH reception of CC #0 and HARQ information for PDSCH reception of CC #3 together can be PUCCH of CC #0, PUCCH of CC #3, or PUCCH of other CC (cell).

Example 4-3

First, the terminal 20 determines k from one indicator included in the single DCI for scheduling PDSCH reception of multiple CCs received from the base station apparatus 10. In determining k, the table 9.2.3-1 described in Non-Patent Document 3 may be used, or information other than the table 9.2.3-1 described in Non-Patent Document 3 may be used.

Next, the terminal 20 determines a timing after k [slot] counted in slots of a specific SCS of the multiple CCs in which PDSCH reception is scheduled by a single DCI as a common HARQ feedback timing for the multiple CCs.

An example where CC #0 (SCS=30 kHz) and CC #3 (SCS=15 kHz) are the target CCs scheduled by a single DCI is shown in FIG. 14 used in Example 4-2. Assume that the specific SCS is 30 kHz.

In the example of FIG. 14, in the multiple CCs, a CC having a SCS of 30 kHz is CC #0. Therefore, after receiving PDSCH at CC #0, the terminal 20 transmits HARQ information for PDSCH reception of CC #0 and HARQ information for PDSCH reception of CC #3 together at the same timing after k-slots of CC #0. PUCCH for transmitting HARQ information for PDSCH reception of CC #0 and HARQ information for PDSCH reception of CC #3 together can be PUCCH of CC #0, PUCCH of CC #3, or PUCCH of other CC (cell).

According to Example 4, even if SCS differs among scheduled multiple CCs, HARQ feedback can be simultaneously transmitted in 1 PUCCH.

Example 5

Also in Example 5, when the terminal 20 receives a single DCI for scheduling PDSCH reception of multiple CCs from the base station apparatus 10, the terminal 20 assumes that the single DCI includes one indicator. That is, also in Example 5, the base station apparatus 10 includes one indicator in the single DCI for scheduling PDSCH reception of multiple CCs and transmits it to the terminal 20.

In Example 5, when the terminal 20 receives a single DCI for scheduling PDSCH reception of multiple CCs from the base station apparatus 10, the terminal 20 assumes (determines) that SCSs are the same among the multiple CCs for scheduling. That is, in Example 5, when scheduling PDSCH reception of multiple CCs with a single DCI, the base station apparatus 10 determines the multiple CCs as multiple CCs of the same SCS.

In Example 5, when the terminal 20 receives a single DCI for scheduling PDSCH reception of the multiple CCs from the base station apparatus 10, the terminal 20 assumes (determines) that the timing of PDSCH reception is the same (the same slot) among the multiple CCs for scheduling. That is, in Example 5, when scheduling PDSCH reception of multiple CCs with a single DCI, the base station apparatus 10 performs scheduling such that PDSCH reception timing is the same among the multiple CCs.

An example of operation is described. First, the terminal 20 determines k from one indicator included in the single DCI for scheduling PDSCH reception of multiple CCs received from the base station apparatus 10. In determining k, the table 9.2.3-1 described in Non-Patent Document 3 may be used, or information other than the table 9.2.3-1 described in Non-Patent Document 3 may be used.

Subsequently, the terminal 20 determines HARQ feedback timing of each of the multiple CCs in which PDSCH reception is scheduled by the single DCI as a timing k slots after reception of PDSCH at each CC, and transmits HARQ information for PDSCH reception of the multiple CCs collectively at that timing.

Figure 15:
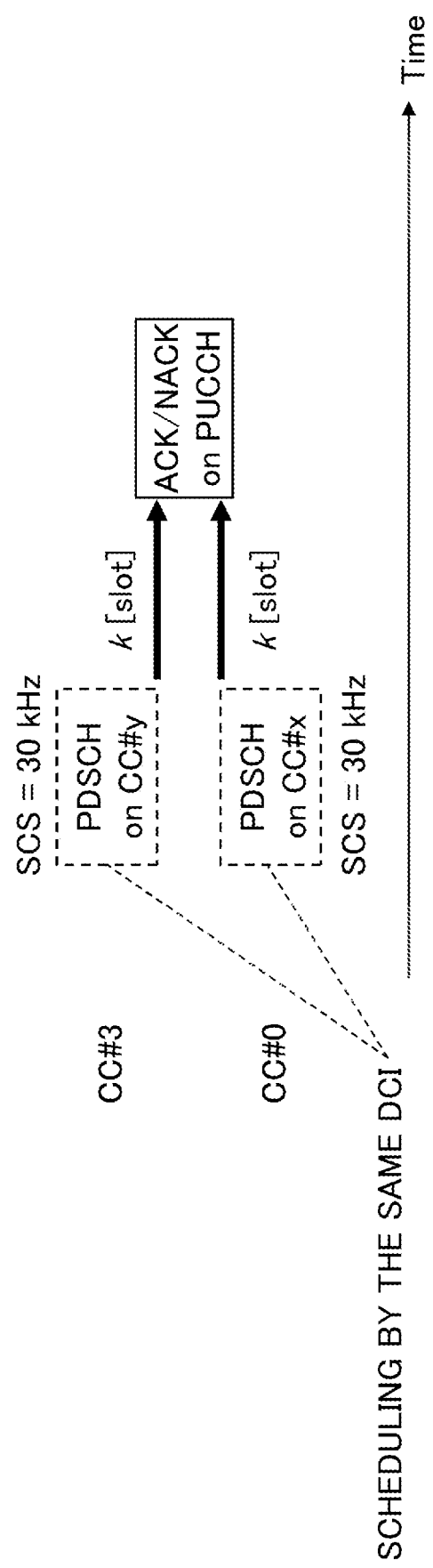
FIG. 15 A diagram for explaining an example of a terminal's operation.

FIG. 15 shows an example where CC #0 (SCS=30 kHz) and CC #3 (SCS=30 kHz) are target CCs scheduled by a single DCI. As shown in FIG. 15, since the slot lengths are the same between CCs, HARQ information for PDSCH reception of multiple CCs can be transmitted together.

If SCS is not the same among the scheduled multiple CCs, the transmission timing of HARQ information for PDSCH reception will be different between CCs, for example, as shown in FIG. 6, making the use of PUCCH resources inefficient. Meanwhile, in Example 5, since HARQ information for PDSCH reception of the multiple CCs can be transmitted together, PUCCH resources can be used efficiently.

In Example 5, even if HARQ feedback timing (k) to be indicated is one (common among the multiple CCs), HARQ information of the multiple CCs can be returned to the base station apparatus 10 by one PUCCH.

(Apparatus Configuration)

Next, a functional configuration example of the base station apparatus 10 and the terminal 20 for performing the processes and operations described above will be described. The base station apparatus 10 and the terminal 20 include functions for implementing the above-described Examples 1-5. However, the base station apparatus 10 and the terminal 20 may each comprise only the functions of any one of Examples 1-5.

<Base Station Apparatus 10>

Figure 16:
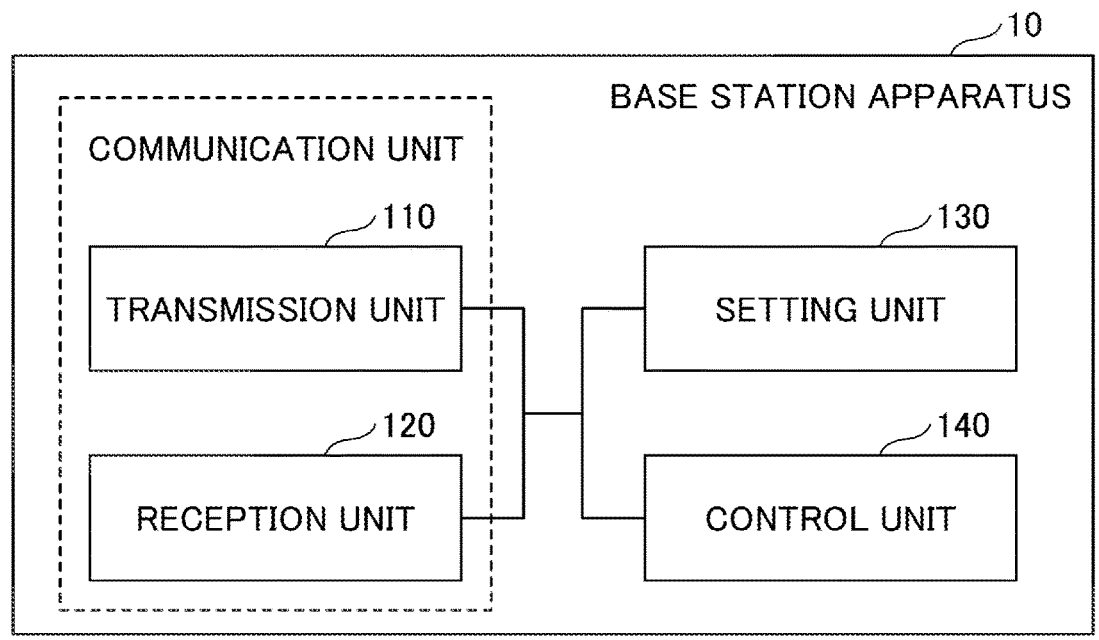
FIG. 16 An example of a functional configuration of the base station apparatus 10 according to an embodiment of the present invention.

FIG. 16 is a diagram illustrating an example of a functional configuration of the base station apparatus 10. As shown in FIG. 16, the base station apparatus 10 includes a transmission unit 110, a reception unit 120, a setting unit 130, and a control unit 140. The functional configuration shown in FIG. 16 is only one example. If the operation according to the embodiments of the present invention can be performed, the function category and the name of the function unit may be any one. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. The transmission unit 110 has a function to transmit NR-PSS, NR-SSS, NR-PBCH, DL/UL control signals, DL data, and the like to the terminal 20. The transmission unit 110 transmits the configuration information described in Examples 1-5.

The setting unit 130 stores preconfigured configuration information and various configuration information to be transmitted to the terminal 20 in the storage device and reads the preconfigured configuration information from the storage device if necessary. The control unit 140 performs, for example, resource allocation and control of the entire base station apparatus 10. A function unit related to signal transmission in the control unit 140 may be included in the transmission unit 110, and a function unit related to signal reception in the control unit 140 may be included in the reception unit 120. The transmission unit 110 and the reception unit 120 may be called a transmitter and a receiver, respectively.

<Terminal 20>

Figure 17:
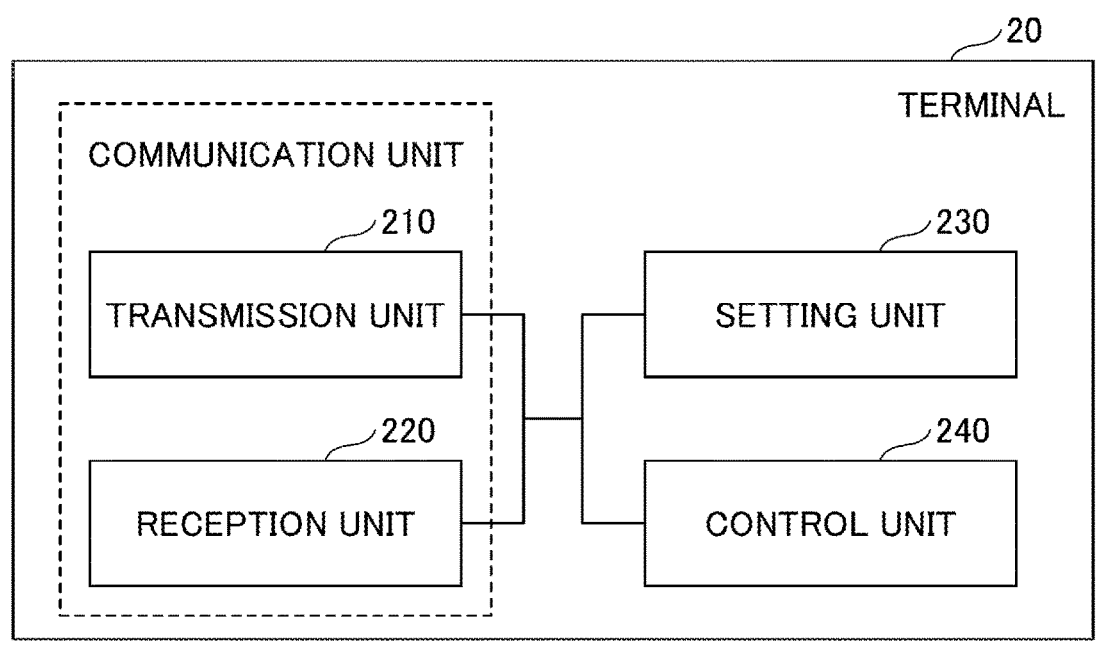
FIG. 17 A diagram showing an example of a functional configuration of a terminal 20 according to an embodiment of the present invention.

FIG. 17 is a diagram illustrating an example of a functional configuration of the terminal 20. As shown in FIG. 17, the terminal 20 includes a transmission unit 210, a reception unit 220, a setting unit 230, and a control unit 240. The functional configuration shown in FIG. 17 is only one example. If the operation according to the embodiments of the present invention can be performed, the function category and the name of the function unit may be any one. The transmission unit 210 and the reception unit 220 may be called a communication unit.

The transmission unit 210 creates a transmission signal from the transmission data and wirelessly transmits the transmission signal. The reception unit 220 receives various signals wirelessly and acquires signals from higher layers from the received signal of the physical layer.

The setting unit 230 stores various configuration information received from the base station apparatus 10 by the reception unit 220 in the storage device and reads it from the storage device as necessary. The setting unit 230 also stores preconfigured configuration information. The control unit 240 determines feedback timing, controls the entire terminal 20, and the like. A function unit related to signal transmission in the control unit 240 may be included in the transmission unit 210, and a function unit related to signal reception in the control unit 240 may be included in the reception unit 220. The transmission unit 210 and the reception unit 220 may be called a transmitter and a receiver, respectively.

The terminal 20 and the base station apparatus 10 are configured as, for example, a terminal and a base station apparatus described in the following items. Feedback methods described below are also provided.

Configuration Related to Example 1

(Item 1)

A terminal comprising:
a reception unit configured to receive a piece of control information for scheduling PDSCH reception in multiple CCs from a base station apparatus; and
a control unit configured to obtain a feedback timing indicator value for each CC in the multiple CCs from the control information, and to determine a feedback timing for each CC by using the feedback timing indicator value.

(Item 2)

The terminal as described in item 1,
wherein the control unit is configured to determine correspondence between a CC and a feedback timing indicator value based on an index of the CC or SCS of the CC.

(Item 3)

The terminal as described in item 1,
wherein the control unit is configured to determine correspondence between a CC and a feedback timing indicator value based on a type of a cell corresponding to the CC.

(Item 4)

A base station apparatus comprising:
a transmission unit configured to transmit a piece of control information for scheduling PDSCH reception in multiple CCs to a terminal; and
a reception unit configured to receive feedback information transmitted at a feedback timing determined based on a feedback timing indicator value for each CC in the multiple CCs included in the control information.

(Item 5)

A feedback method executed by a terminal, comprising:
receiving a piece of control information for scheduling PDSCH reception in multiple CCs from a base station apparatus; and
obtaining a feedback timing indicator value for each CC in the multiple CCs from the control information, and determining a feedback timing for each CC by using the feedback timing indicator value.

Configuration Related to Examples 2 and 5

(Item 1)

A terminal comprising:
a reception unit configured to receive a piece of control information for scheduling PDSCH reception in multiple CCs from a base station apparatus; and
a control unit configured to obtain a feedback timing indicator value from the control information, and to determine a feedback timing for each CC of the multiple CCs by using the feedback timing indicator value.

(Item 2)

The terminal as described in item 1, wherein the control unit is configured to determine the feedback timing for each CC of the multiple CCs based on information of a table in which one feedback timing indicator value is associated with a plurality of feedback timings.

(Item 3)

The terminal as described in item 1, wherein the control unit determines the feedback timing for each CC of the multiple CCs based on information obtained by dividing the feedback timing indicator value obtained from the control information according to bit positions.

(Item 4)

The terminal as described in item 1, wherein, when receiving the control information for scheduling PDSCH reception in multiple CCs, SCSs of the multiple CCs scheduled by the control information are the same.

(Item 5)

A base station apparatus comprising:
a transmission unit configured to transmit a piece of control information for scheduling PDSCH reception in multiple CCs to a terminal; and
a reception unit configured to receive feedback information transmitted at a feedback timing determined based on a feedback timing indicator value included in the control information.

(Item 6)

A feedback method executed by a terminal, comprising:
receiving a piece of control information for scheduling PDSCH reception in multiple CCs from a base station apparatus; and
obtaining a feedback timing indicator value from the control information, and determining a feedback timing for each CC of the multiple CCs by using the feedback timing indicator value.

Configuration Related to Examples 3 and 4

(Item 1)

A terminal comprising:
a reception unit configured to receive a piece of control information for scheduling PDSCH reception in multiple CCs from a base station apparatus; and
a control unit configured to obtain a feedback timing indicator value from the control information, and to determine a feedback timing for each CC in the multiple CCs by using the feedback timing indicator value and a parameter.

(Item 2)

The terminal as described in item 1, wherein the control unit is configured to use a feedback timing for a CC obtained from the feedback timing indicator value and the parameter in order to determine a feedback timing for another CC.

(Item 3)

The terminal as described in item 1, wherein the control unit is configured to determine a timing, as the feedback timing, by counting a slot number obtained from the feedback timing indicator value based on slots of a specific CC determined based on SCS of each CC in the multiple CCs.

(Item 4)

A base station apparatus comprising:
a transmission unit configured to transmit a piece of control information for scheduling PDSCH reception in multiple CCs to a terminal; and
a reception unit configured to receive feedback information transmitted at a feedback timing determined based on a feedback timing indicator value included in the control information and a parameter (Item 5)

A feedback method executed by a terminal, comprising:
receiving a piece of control information for scheduling PDSCH reception in multiple CCs from a base station apparatus; and
obtaining a feedback timing indicator value from the control information, and determining a feedback timing for each CC in the multiple CCs by using the feedback timing indicator value and a parameter.

According to the configuration described in any of the foregoing items, there is provided a technique for enabling a terminal to transmit HARQ information for PDSCH reception at the same timing between CCs when PDSCH reception is scheduled in multiple CCs with one DCI.

(Hardware Configuration)

The block diagrams (FIG. 16 and FIG. 17) used in the description of the embodiment described above illustrate the block of functional unit. Such function blocks (configuration parts) are attained by at least one arbitrary combination of hardware and software. In addition, an attainment method of each of the function blocks is not particularly limited. That is, each of the function blocks may be attained by using one apparatus that is physically or logically coupled, by directly or indirectly (for example, in a wired manner, over the radio, or the like) connecting two or more apparatuses that are physically or logically separated and by using such a plurality of apparatuses. The function block may be attained by combining one apparatus described above or a plurality of apparatuses described above with software.

The function includes determining, determining, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmitting unit or the transmitter. As described above, the attainment method thereof is not particularly limited.

Figure 18:
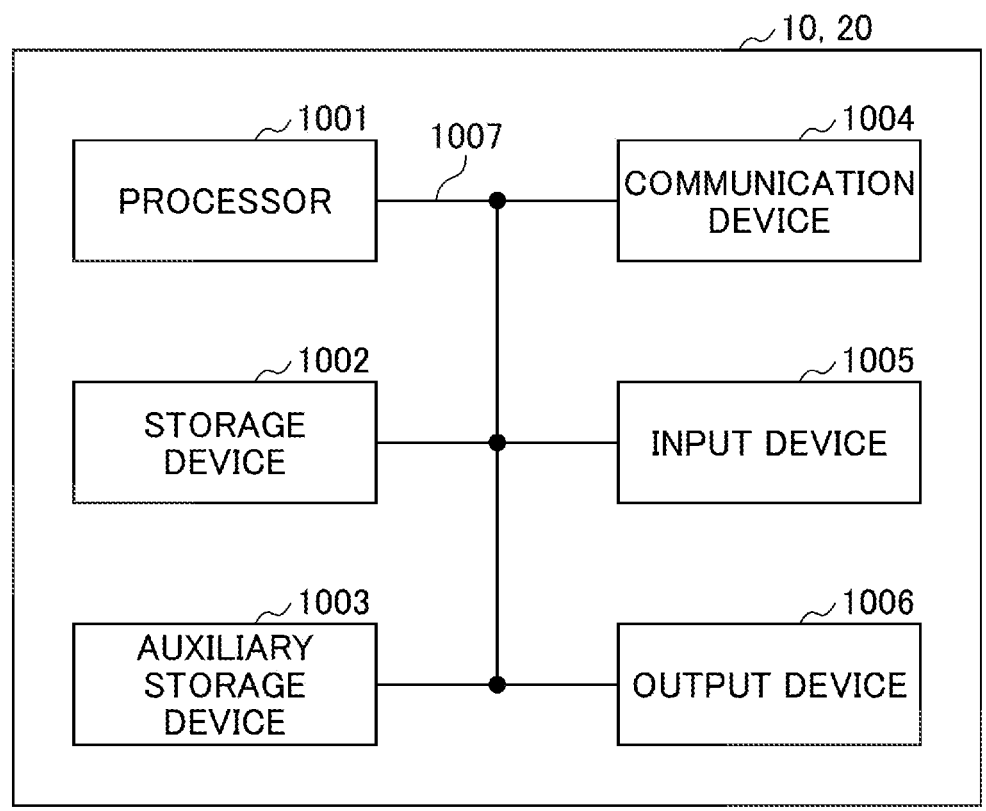
FIG. 18 A diagram illustrating an example of the hardware configuration of the base station apparatus 10 or the terminal 20 according to an embodiment of the present invention.

For example, the base station apparatus 10, the user terminal 20, and the like in one embodiment of this disclosure may function as a computer for performing the processing of a radio communication method of this disclosure. FIG. 18 is a diagram illustrating an example of a hardware configuration of the base station apparatus and the user terminal 20 according to one embodiment of this disclosure. The base station apparatus 10 and the user terminal 20 described above may be physically configured as a computer apparatus including a processor 1001, a storage unit 1002, an auxiliary storage unit 1003, a communication unit 1004, an input unit 1005, an output unit 1006, a bus 1007, and the like.

Note that, in the following description, the word "apparatus" can be replaced with a circuit, a device, a unit, or the like. The hardware configuration of the base station apparatus 10 and the user terminal 20 may be configured to include one or a plurality of apparatuses illustrated in the drawings, or may be configured not to include a part of the apparatuses.

Each function of the base station apparatus 10 and the user terminal 20 is attained by reading predetermined software (a program) on hardware such as the processor 1001 and the storage unit 1002 such that the processor 1001 performs an operation, and by controlling the communication of the communication unit 1004 or by controlling at least one of reading and writing of data in the storage unit 1002 and the auxiliary storage unit 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be attained by the processor 1001.

In addition, the processor 1001 reads out a program (a program code), a software module, data, and the like to the storage unit 1002 from at least one of the auxiliary storage unit 1003 and the communication unit 1004, and thus, executes various processings. A program for allowing a computer to execute at least a part of the operation described in the embodiment described above is used as the program. For example, the control unit 140 of the base station apparatus 10 illustrated in FIG. 16 may be attained by a control program that is stored in the storage unit 1002 and is operated by the processor 1001. In addition, for example, the control unit 240 of the user terminal 20 illustrated in FIG. 17 may be attained by a control program that is stored in the storage unit 1002 and is operated by the processor 1001. It has been described that the various processings described above are executed by one processor 1001, but the processings may be simultaneously or sequentially executed by two or more processors 1001. The processor 1001 may be mounted on one or more chips. Note that, the program may be transmitted from a network through an electric communication line.

The storage unit 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage unit 1002 may be referred to as a register, a cache, a main memory (a main storage unit), and the like. The storage unit 1002 is capable of retaining a program (a program code) that can be executed in order to implement a communication method according to one embodiment of this disclosure, a software module, and the like.

The auxiliary storage unit 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The auxiliary storage unit 1003 may be referred to as an auxiliary storage unit. The storage medium described above, for example, may be a database including at least one of the storage unit 1002 and the auxiliary storage unit 1003, a server, and a suitable medium.

The communication unit 1004 is hardware for performing communication with respect to the computer through at least one of a wire network and a radio network (a transmitting and receiving device), and for example, is also referred to as a network device, a network controller, a network card, a communication module, and the like. The communication unit 1004, for example, may be configured by including a high frequency switch, a duplexer, a filter, a frequency synthesizer, and the like, in order to attain at least one of frequency division duplex (FDD) and time division duplex (TDD). For example, a transmitting and receiving antenna, an amplifier, a transmitting and receiving unit, a transmission path interface, and the like may be attained by the communication unit 1004. In the transmitting and receiving unit, the transmitting unit and the receiving unit are mounted by being physically or logically separated.

The input unit 1005 is an input device for receiving input from the outside (for example, a keyboard, a mouse, a microphone, a switch, a button, a sensor, and the like). The output unit 1006 is an output device for implementing output with respect to the outside (for example, a display, a speaker, an LED lamp, and the like). Note that, the input unit 1005 and the output unit 1006 may be integrally configured (for example, a touch panel).

In addition, each of the apparatuses such as the processor 1001 and the storage unit 1002 may be connected by the bus 1007 for performing communication with respect to information. The bus 1007 may be configured by using a single bus, or may be configured by using buses different for each of the apparatuses.

In addition, the base station apparatus 10 and the user terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be attained by the hardware. For example, the processor 1001 may be mounted by using at least one of the hardware.

Supplement to Embodiment

As described above, the embodiment of the invention has been described, but the disclosed invention is not limited to the embodiment, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station apparatus 10 and the user terminal 20 have been described by using a functional block diagram, but such an apparatus may be attained by hardware, software, or a combination thereof. Each of software that is operated by a processor of the base station apparatus 10 according to the embodiment of the invention and software that is operated by a processor of the user terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable recording media.

In addition, the notification of the information is not limited to the aspect/embodiment described in this disclosure, and may be performed by using other methods. For example, the notification of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Here, a specific operation that is performed by the base station apparatus 10 may be performed by an upper node, in accordance with a case. In a network provided with one or a plurality of network nodes including the base station apparatus 10, it is obvious that various operations that are performed in order for communication with respect to the user terminal 20 can be performed by at least one of the base station apparatus 10 and network nodes other than the base station apparatus 10 (for example, MME, S-GW, or the like is considered as the network node, but the network node is not limited thereto). In the above description, a case is exemplified in which the number of network nodes other than the base station apparatus 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The information or the like that is input and output may be retained in a specific location (for example, a memory), or may be managed by using a management table. The information or the like that is input and output can be subjected to overwriting, updating, or editing. The information or the like that is output may be deleted. The information or the like that is input may be transmitted to the other apparatuses.

Judgment in this disclosure may be performed by a value represented by 1 bit (0 or 1), may be performed by a truth-value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not a limited name in any respect. Further, expressions or the like using such parameters may be different from those explicitly disclosed in this disclosure. Various channels (for example, PUSCH, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station apparatus", "fixed station", "NodeB", "eNodeB (eNB)", "gNodeB (gNB)", "access point", "transmission point", "reception point", "transmission and reception point", "cell", "sector", "cell group", "carrier", "component carrier", and the like can be interchangeably used. The base station may be referred to by a term such as a macrocell, a small cell, a femtocell, and a picocell.

The base station is capable of accommodating one or a plurality of (for example, three) cells. In a case where the base station accommodates a plurality of cells, the entire coverage area of the base station can be classified into a plurality of small areas, and each of the small areas is capable of providing communication service by a base station sub-system (for example, an indoor type small base station (a remote radio head (RRH)). The term "cell" or "sector" indicates a part of the coverage area or the entire coverage area of at least one of the base station and the base station sub-system that perform the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication unit, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved at the time of a communication operation. For example, at least one of the base station and the mobile station may be an internet of things (IoT) device such as a sensor.

In addition, the base station apparatus in this disclosure may be replaced with the user terminal. For example, each aspect/embodiment of this disclosure may be applied to a configuration in which communication between the base station apparatus and the user terminal is replaced with communication in a plurality of user terminals 20 (for example, may be referred to as device-to-device (D2D), vehicle-to-everything (V2X), and the like). In this case, the function of the base station apparatus 10 described above may be provided in the user terminal 20. In addition, the words "up", "down", and the like may be replaced with words corresponding to the communication between the terminals (for example, "side"). For example, an uplink channel, a downlink channel, and the like may be replaced with a side channel.

Similarly, the user terminal in this disclosure may be replaced with the base station apparatus. In this case, the function of the user terminal described above may be provided in the base station apparatus.

The terms "determining" and "determining" used in this disclosure may involve diverse operations. "Determining" and "determining", for example, are capable of including "determining" and "determining" with respect to judging, calculating, computing, processing, deriving, investigating, looking up (search, inquiry) (for example, looking up in a table, a database, or another data structure), and ascertaining, and the like. In addition, "determining" and "determining" are capable of including "determining" and "determining" with respect to receiving (for example, receiving information), transmitting (for example, transmitting information), input, output, and accessing (for example, accessing data in a memory), and the like. In addition, "determining" and "determining" are capable of including "determining" and "determining" with respect to resolving, selecting, choosing, establishing, comparing, and the like. That is, "determining" and "determining" are capable of including "determining" and "determining" with respect to any operation. In addition, "determining (determining)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical couple or connection, may be logical couple or connection, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot on the basis of a standard to be applied.

The description "on the basis of" that is used in this disclosure does not indicate "only on the basis of", unless otherwise specified. In other words, the description "on the basis of" indicates both "only on the basis of" and "at least on the basis of".

Any reference to elements using the designations "first," "second," and the like, used in this disclosure, does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other designations respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, 1 to 13 symbols), or may be a period longer than 1 ms. Note that, unit representing TTI may be referred to as a slot, a mini slot, and the like, but not a subframe. Also, one slot may be called a unit time. The unit time may be different in each cell according to numerology.

Here, TTI, for example, indicates minimum time unit of scheduling in radio communication. For example, in an LTE system, the base station performs scheduling for allocating a radio resource (a frequency bandwidth, transmission power, and the like that can be used in each of the user terminals 20) in TTI unit, with respect to each of the terminals 20. Note that, the definition of TTI is not limited thereto.

TTI may be transmission time unit of a data packet (a transport block), a code block, a codeword, and the like that are subjected to channel coding, or may be processing unit of scheduling, link adaptation, and the like. Note that, when TTI is applied, a time zone in which the transport block, the code block, the codeword, and the like are actually mapped (for example, the number of symbols) may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a common TTI (TTI in LTE Rel. 8-12), a normal TTI, a long TTI, a common subframe, a normal subframe, a long subframe, a slot, and the like. TTI shorter than the common TTI may be referred to as a shortened TTI, a short TTI, a partial TTI (or a fractional TTI), a shortened subframe, a short subframe, a mini slot, a subslot, a slot, and the like.

Note that, the long TTI (for example, the common TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be determined on the basis of the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a subcarrier group (SCG), a resource element group (REG), a PRB pair, a RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it may not assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are respectively different from C". The terms "separated", "coupled", and the like may be interpreted as with "being different".

Each aspect/embodiment described in this disclosure may be independently used, may be used by being combined, or may be used by being switched in accordance with execution. In addition, the notification of predetermined information (for example, the notification of "being X") is not limited to being performed explicitly, and may be performed implicitly (for example, the notification of the predetermined information is not performed).

In the present disclosure, the SS block or CSI-RS is an example of a synchronization signal or reference signal.

As described above, this disclosure has been described in detail, but it is obvious for a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

EXPLANATIONS OF LETTERS OR NUMERALS

10 BASE STATION APPARATUS
110 TRANSMISSION UNIT
120 RECEPTION UNIT
130 CONFIGURATION UNIT
140 CONTROL UNIT
20 USER TERMINAL
210 TRANSMISSION UNIT
220 RECEPTION UNIT
230 CONFIGURATION UNIT
240 CONTROL UNIT
1001 PROCESSOR
1002 STORAGE UNIT
1003 AUXILIARY STORAGE UNIT
1004 COMMUNICATION UNIT
1005 INPUT UNIT
1006 OUTPUT UNIT

The invention claimed is:

1. A terminal comprising:
a receiver configured to receive a piece of control information for scheduling physical downlink shared channel (PDSCH) reception in multiple component carriers (CCs) from a base station apparatus; and
a processor configured to obtain a feedback timing indicator value from the control information, and to determine a feedback timing for each CC of the multiple CCs by using the feedback timing indicator value,
wherein the feedback timing for each CC is determined based on information of a table that maps the feedback timing indicator value to at least one position in a list of feedback timing values.

2. The terminal in claim 1, wherein the table associates one feedback timing indicator value with a plurality of positions in the list.

3. The terminal in claim 1, wherein the processor determines the feedback timing for each CC of the multiple CCs based on information obtained by dividing the feedback timing indicator value obtained from the control information according to bit positions.

4. The terminal in claim 1, wherein, when receiving the control information for scheduling PDSCH reception in multiple CCs, subcarrier spacings of the multiple CCs scheduled by the control information are the same.

5. A base station apparatus comprising:
a transmitter configured to transmit a piece of control information for scheduling physical downlink shared channel (PDSCH) reception in multiple component carriers (CCs) to a terminal; and
a receiver configured to receive feedback information transmitted at a feedback timing determined based on a feedback timing indicator value included in the control information,
wherein the feedback timing for each CC is determined based on information of a table that maps the feedback timing indicator value to at least one position in a list of feedback timing values.

6. A feedback method executed by a terminal, comprising:
receiving a piece of control information for scheduling physical downlink shared channel (PDSCH) reception in multiple component carriers (CCs) from a base station apparatus; and
obtaining a feedback timing indicator value from the control information, and determining a feedback timing for each CC of the multiple CCs by using the feedback timing indicator value,
wherein the feedback timing for each CC is determined based on information of a table that maps the feedback timing indicator value to at least one position in a list of feedback timing values.

* * * * *